United States Patent [19]
Hashimoto et al.

[11] Patent Number: 5,644,404
[45] Date of Patent: Jul. 1, 1997

[54] FACSIMILE SERVER SYSTEM CAPABLE OF RECOGNIZING AT TRANSMITTING END AN ACCESS TO RECEIVED FACSIMILE DATA AT RECEIVING END

[75] Inventors: Shin'ichi Hashimoto; Tomihisa Hatano; Kazuhiro Umemura; Hiroshi Kawamura, all of Yokohama, Japan

[73] Assignee: Hitachi, Ltd., Tokyo, Japan

[21] Appl. No.: 300,964

[22] Filed: Sep. 6, 1994

[30] Foreign Application Priority Data

Sep. 8, 1993 [JP] Japan ................... 5-223549

[51] Int. Cl.$^6$ ................................................. H04N 1/32
[52] U.S. Cl. .................... 358/402; 358/403; 358/434; 358/440
[58] Field of Search .................. 358/403, 402, 358/407, 439, 440, 434, 305

[56] References Cited

U.S. PATENT DOCUMENTS

| | | | |
|---|---|---|---|
| 4,642,697 | 2/1987 | Wada | 358/439 |
| 5,377,017 | 12/1994 | Lam | 358/405 |
| 5,392,336 | 2/1995 | Chang et al. | 358/403 |
| 5,404,231 | 4/1995 | Bloomfield | 358/407 |

FOREIGN PATENT DOCUMENTS 3-833 1/1991 Japan ................... H04N 1/00

*Primary Examiner*—Scott A. Rogers
*Attorney, Agent, or Firm*—Fay, Sharpe, Beall, Fagan, Minnich & McKee

[57] ABSTRACT

A facsimile receiving processing unit in a facsimile server terminal receives and stores facsimile data in a data storage unit. A receiving-end user issues a request for accessing the received facsimile data stored in the data storage unit through a received facsimile accessing unit in a client terminal to a received facsimile manager in the facsimile server terminal. At the time when the received facsimile data is accessed for the first time, a response data creating unit in the facsimile server terminal automatically creates response data which indicates that the facsimile data has been accessed at the receiving end, and then the response data is sent back to the sending-end facsimile machine by a facsimile transmission processing unit in the facsimile server terminal. This allows the sending-end user to recognize whether the facsimile data has actually been accessed by the receiving-end user.

10 Claims, 22 Drawing Sheets

USER SEPARATE INDEX FILE

USER COMMON INDEX FILE

FACSIMILE RECEIVING HISTORY DATA FILE

FACSIMILE SENDING HISTORY DATA FILE

FACSIMILE SENDING JOB QUEUE

FIG. 13

RECEIVED FACSIMILE FILE LIST

| SEPARATE | | | COMMON | | |
|---|---|---|---|---|---|
| RECEIVED FAX FILE NAME | SENDING-END FAX NO. | TIME OF RECEIPT | RECEIVED FAX FILE NAME | SENDING-END FAX NO. | TIME OF RECEIPT |
| xxxx xxxx | xxxxxx xxxxxx | xxxxx xxxxx | xxxxx xxxxx | xxxxxx xxxxxx | xxxxx xxxxx |
| xxxx | xxxxxx | xxxxx | xxxxx | xxxxxx | xxxxx |
| ... | ... | ... | ... | ... | ... |

( DISPLAY )  ( COPY )  ( DELETE )  ( PRINT )

FACSIMILE SENDING JOB DATA

FIG. 24A

OUTSIDE NETWORK TELEPHONE
NUMBER FILE

| FAX NO. | USER NAME |
|---------|-----------|
| ⋮ | ⋮ |

2401 — FAX NO.  
2402 — USER NAME  
2400

FIG. 24B

INSIDE NETWORK TELEPHONE
NUMBER FILE

| USER ID | USER NAME |
|---------|-----------|
| ⋮ | ⋮ |

2411 — USER ID  
2412 — USER NAME  
2410

FIG. 25A

TEMPLATE FORMAT OF RESPONSE DATA
(FOR DISPLAY, COPY & PRINT)

TO: (2501) ~2500

Your facsimile letter shown below has been accessed by (2502)

on (2503)

Type of access: (2504)

TEMPLATE FORMAT OF RESPONSE DATA
(FOR DELETION)

TO: (2511) ~2510

Your facsimile letter shown below has been deleted by (2512)

on (2513)

without being seen by anyone.
Please call if necessary.

(2514)

FACSIMILE SERVER SYSTEM CAPABLE OF RECOGNIZING AT TRANSMITTING END AN ACCESS TO RECEIVED FACSIMILE DATA AT RECEIVING END

BACKGROUND OF THE INVENTION

The present invention relates to a facsimile server system in which a computer terminal or facsimile server terminal which receives and stores facsimile data is interconnected via a network with another computer terminal or client terminal which accesses the facsimile data stored in the facsimile server through the network, and particularly to such a facsimile server system in which at the time when the received facsimile data is accessed for the first time by the client terminal, the facsimile server terminal transmits, as response data, data acknowledging receipt of the facsimile data to a source terminal having sent the same.

In a facsimile machine or a facsimile server terminal which comprises a computer terminal, such as a personal computer or workstation containing a board or adapter which offers a facsimile modem capability, it is known to display, on a display of the facsimile server terminal, or on a tiny liquid-crystal display panel of the facsimile machine, a result of the transmitting/receiving process which is obtained, for example, in the Group III facsimile communication procedure, and which indicates whether the result of the transmitting/receiving process was successful or not. This allows a user who sent the facsimile data, to recognize whether or not the facsimile data has been successfully sent to a destination facsimile machine or facsimile server terminal.

With this prior art system, it is convenient to be able to know whether the result of the communication was successful or unsuccessful. However, this is not always satisfactory because it is still impossible to recognize whether the facsimile data has actually been correctly accessed in hand by the target user at the destination end, and eventually a troublesome procedure, such as directly calling the target user, is necessary to confirm his or her safe receipt of the facsimile data.

In the meantime, some of the currently available conventional facsimile machines or facsimile server terminals can transmit facsimile data with additional information, such as their facsimile numbers (telephone numbers), set in a non-standardized field of information within a data frame, which is exchanged during the facsimile communication procedure. With this arrangement, a facsimile machine or facsimile server terminal is able to recognize the facsimile number of the sending-end facsimile machine (or facsimile server terminal) having sent the facsimile data, by referring to the additional data contained in that particular field of information.

SUMMARY OF THE INVENTION

It is an object of the present invention to provide a facsimile server system in which, when a user at a receiving end has accessed facsimile data sent from a sending end, the sending-end user having sent the facsimile data is provided with response data which indicates that the facsimile data has been accessed by the receiving-end user.

According to the present invention, in order for the sending-end user to be able to recognize whether or not the receiving-end user has actually accessed the facsimile data in hand, there is provided a facsimile server system, comprising a facsimile server terminal including a sending/receiving device for sending/receiving facsimile data via a communication line, and a storage device for storing facsimile data received by the sending/receiving device; a client terminal coupled via a network to the facsimile server terminal and including an access device responsive to a user's command for accessing received facsimile data stored in the storage means in the facsimile server terminal; the facsimile server terminal further including: a manager for managing a sending-end facsimile number in correspondence with the facsimile data in a case where the facsimile data is received together with the sending-end facsimile number, and also managing access information in correspondence with the facsimile data, the access information indicating whether or not the facsimile data stored in the storage means has already been accessed by the access device in the client terminal; and a response data sending device, activated when the facsimile data stored in the storage device is accessed by the access device in the client terminal and when the access information indicates that the facsimile data has not yet been accessed by the access device, for calling the sending-end facsimile number corresponding to the accessed facsimile data so as to send back response data which indicates that the facsimile data has been accessed by a user at the receiving end.

The facsimile number of the facsimile server terminal or the facsimile machine at the sending end can be derived from additional information contained in an information field as stated above.

More specifically, the facsimile server system according to the present invention comprises the following elements:

(1) means for managing, upon receipt of facsimile data together with a facsimile number of a sending end, both the facsimile number and access information in correspondence with the received facsimile data, the access information indicating whether or not the received facsimile data has already been accessed at the receiving end.

(2) means for sending response data, when the facsimile data is accessed at the receiving end and when the access information for the facsimile data indicates that it has not yet been accessed, by calling the sending-end facsimile number of the received facsimile data, the response data indicating that the facsimile data has been accessed by a user at the receiving end.

The response data may, preferably, include receiving-end user information which identifies the user of the client terminal containing the access device having accessed the facsimile data, a type of access carried out by the access means, and the time at which the access was made. The response data may further include one of sending-end user information which identifies the user corresponding to the sending-end facsimile number, and a part of the received facsimile data.

When the type of access carried out by the access device is a deletion of the facsimile data, the response data may preferably include a message which will attract the sending-end user's attention, stating that the facsimile data sent by him or her has been deleted without actually being seen by anyone.

During operation of the facsimile server system of the present invention, when a facsimile server terminal receives facsimile data by a transmitting/receiving device, the received facsimile data is stored into a storage device. At that time, the management means or supervisor registers a sending-end facsimile number received with the facsimile data, in correspondence with the same. The access information, also handled by the supervisor, indicates whether or not the received facsimile data has already been accessed at the receiving end. At the time when the received facsimile data has just been stored, the access information shows that no access has yet occurred to the facsimile data.

In a client terminal which is interconnected via a network with the facsimile server terminal, an access device accesses the facsimile data stored in the storage device in response to a user's instruction. The user's instruction is generally, for example, to display, copy, print or delete the facsimile data. Therefore, the type of access is "transfer" of the facsimile data in the case of display or copy being instructed, while the type of access is "print" or "delete" in the case of printing or deleting instructions, respectively.

In the facsimile server terminal, when the access device accesses the facsimile data stored in the storage device, a reference is made to the access information corresponding to that particular facsimile data. If the access information shows that the facsimile data has not yet been accessed by that time, then a response data transmitter will call the sending-end facsimile number and transmit response data which indicates that the facsimile data has been accessed at the receiving end thereof. This occurs because the access information for that facsimile data indicated no access had occurred to the same. Thus, the response data is transmitted only when the facsimile data has been accessed for the first time.

Subsequently, the access information for that facsimile data is changed so as to newly indicate that the facsimile data has been accessed by the access device, under control of the supervisor.

Any accesses to the facsimile data for the second or subsequent time will not cause the response data transmitter to transmit the response data, because the access information already indicates that an access has been made to that facsimile data.

As mentioned above, the first access to received facsimile data at the receiving end will cause the facsimile server system of the present invention to automatically transmit response data to a facsimile server system, or a facsimile machine, at the sending end of the facsimile data. This indicates that the facsimile data has been recognized by a user at the receiving end, thereby enhancing the reliability of the system from the point of view of the user at the sending end.

In addition, the user at the receiving end need not acknowledge receipt of the facsimile data by any other means, relieving the receiving-end user of the responsibility of doing so.

BRIEF DESCRIPTION OF THE DRAWINGS

FIG. 13 shows an example of a display which lists received facsimile files together with a menu of operation commands;

FIGS. 24A and 24B show data structures of data necessary for a program for creating response data;

FIGS. 25A and 25B show template formats of the response data;

DETAILED DESCRIPTION OF THE PREFERRED EMBODIMENTS

Figure 2:
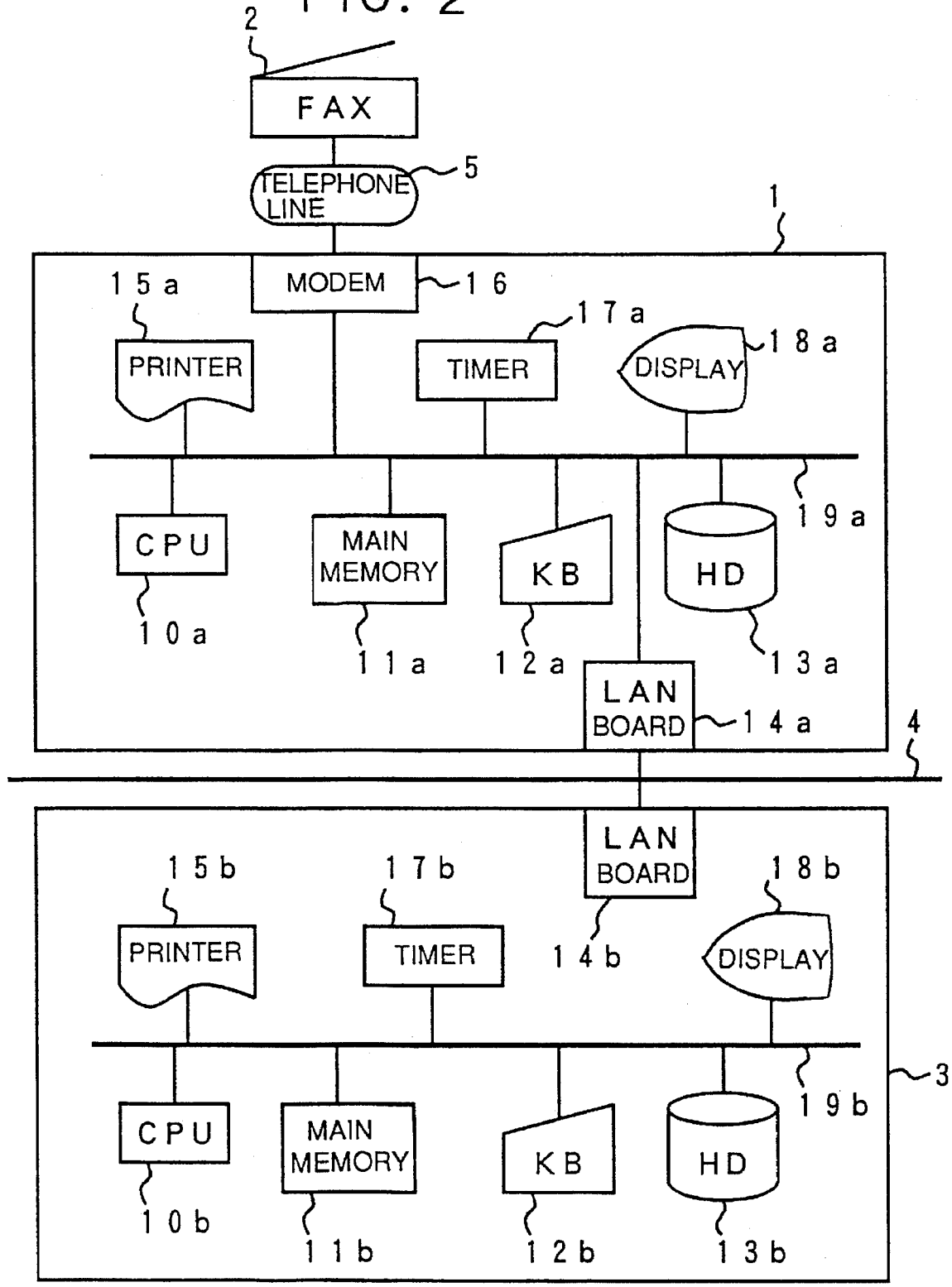
FIG. 2 shows a hardware block diagram of the facsimile server system shown in FIG. 1.

First, an explanation will be given with respect to the functional structure and hardware structure of an embodiment of the present invention. Referring to FIG. 2, there is shown a hardware block diagram of a facsimile server system. Reference numerals 1 and 3 each indicate a computer terminal, such as a personal computer or a workstation (hereinafter referred to only as "terminal"). The terminals 1 and 3 are interconnected via communication media 4 such as a local area network (LAN). The terminal 1 acts as a facsimile server terminal which offers a facsimile sending/receiving capability to the terminal 3 and other terminals (not shown) connected to the same communication media 4 as the terminal 3. The terminal 3 acts as a client terminal which is able to access the terminal 1 to take advantage of the facsimile sending/receiving capability.

Reference numeral 2 indicates a facsimile machine which is connected with the terminal 1 through a telephone line 5 such as a public network or a private branch exchange (PBX). In FIG. 2, the facsimile machine 2 may be a facsimile server terminal like the terminal 1.

Indicated at 10–18 are hardware elements constituting the terminals 1 and 3. Similar elements in terminals 1 and 3 have the same reference numerals but different suffixes "a" and "b" attached, respectively.

Reference numeral 10 indicates a central processing unit (CPU) which controls the overall operation of the terminal. Reference numeral 11 denotes a main memory which stores therein various programs which will be run in order to implement the functions of the terminal. Reference numeral 12 is an input device (e.g., keyboard: KB) for allowing the terminal user to input various commands or data into the terminal.

Reference numeral 13 indicates a non-volatile storage device (such as a hard disk drive: HD) for storing programs available within the terminal, and data necessary for the programs. Reference numeral 14 indicates a network communication control unit (LAN board) to enable the terminals to communicate with each other via the communication media 4. Indicated at 15 and 16 are, respectively, a printer for printing information derived based on the user's command, and a telephone line communication controller (MODEM) for the terminal 1 to access the telephone line 5. Reference numeral 17 indicates a timer device which provides interrupt signals to some of the hardware elements at regular intervals while providing date and time data to the same or other hardware elements. Reference numeral 18 denotes a display device for displaying thereon information obtained based upon the user's command, and reference numeral 19, a bus for interconnecting the elements 11–18.

Figure 1:
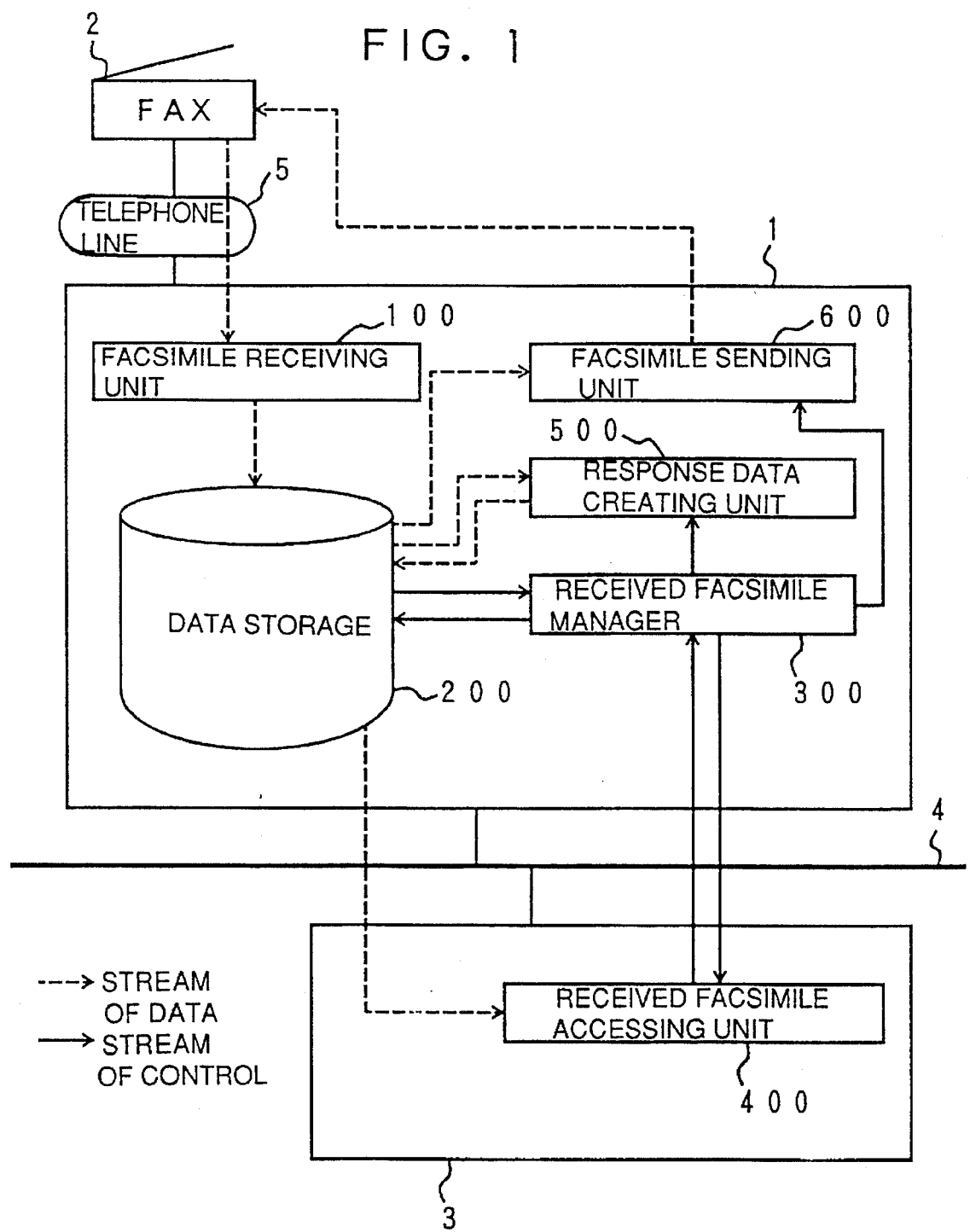
FIG. 1 shows, in the form of a functional block diagram, an embodiment of a facsimile server system according to the present invention.

Referring now to FIG. 1, there is shown a functional block diagram of the facsimile server system according to the embodiment of the invention.

In FIG. 1, a facsimile receiving processing unit 100 operating in the terminal 1 serves to receive facsimile data and associated control information sent via the telephone line 5, and to store them in the data storage unit 200 (explained in detail below). The function of the facsimile receiving processing unit 100 is realized by the CPU 100a, the modem 16 and a facsimile receiving processing program (mentioned below).

The data storage unit 200 is located in the storage device 13 of the terminal 1 and stores therein the facsimile data and associated control data which the facsimile receiving processing unit 100 has received.

If the control information received together with the facsimile data contains a receiving-end user identifier (ID), the facsimile receiving processing unit 100 stores the facsimile data in a separate area in the data storage unit 200 for the user specified by the user ID, whereas if no receiving-end user identifier is contained, the facsimile data is stored in a common area in the data storage unit 200.

A received facsimile manager 300 operating on the terminal 1 serves to manage the facsimile data and associated control data stored in the data storage unit 200, and to deal with a request from the terminal 3 for accessing the facsimile data. This manager 300 is constituted by the CPU 10a, HD 13, LAN board 14a and a receiving facsimile managing program (mentioned below).

A received facsimile accessing unit 400 operating on the terminal 3 serves to request an access to the facsimile data stored in the data storage unit 200 in the terminal 1, and to display, on the display 18b, the facsimile data obtained from the terminal 1. This unit 400 is constituted by the CPU 10b, LAN board 14b, display 18b and a received facsimile accessing program (described in detail below).

A response data creating unit 500, operating on the terminal 1, conducts the following processes when a request is issued from the received facsimile accessing unit 400 in the terminal 3, to access the facsimile data stored in the data storage unit 200 in the terminal 1, and when a sending-end facsimile number (telephone number) of the sending-end facsimile machine is found in the control data associated with the facsimile data. The processes include an automatic creation of response data for acknowledging receipt of and the access to the facsimile data on the basis of the sending-end facsimile number, the receiving-end user ID, the accessed time, a part of the facsimile data, etc., and an issuance of a request to the facsimile transmission processing unit 600 for transmitting the response data to the sending end. The accessed time is the data obtained by the timer device 17b at the time the request was issued to access the facsimile data from the received facsimile accessing unit 400. The response data creating unit 500 is constituted by the CPU 10a, the HD 13a, the timer device 17a and a response data creating program which will be described in detail later.

A facsimile transmission processing unit 600 operating on the terminal 1 serves, in response to a request to transmit the response data from the response data creating unit 500, or a request for sending a facsimile from a client terminal such as the terminal 3 connected to the LAN 4, to convert the data to be sent into corresponding facsimile data and transmit the same through the telephone line 5. This unit 600 is constituted by the CPU 10a, modem 16 and a facsimile transmission processing program mentioned below.

Referring to FIG. 1, the details of programs and data for achieving the functional blocks 100–600 will be described. First, data structures of the data in the data storage unit 200 will be explained referring to FIGS. 3–8.

Figure 3:
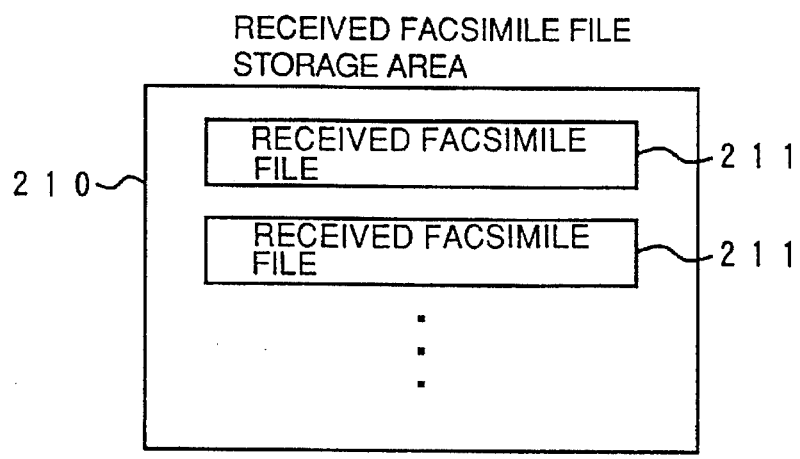
FIG. 3 illustrates a storage area for storing received facsimile files in the embodiment.

Referring to FIG. 3, a received facsimile file storage area 210 is shown, which stores files 211 into which the received facsimile data are converted by the facsimile receiving processing program (described below in detail).

Figure 4:
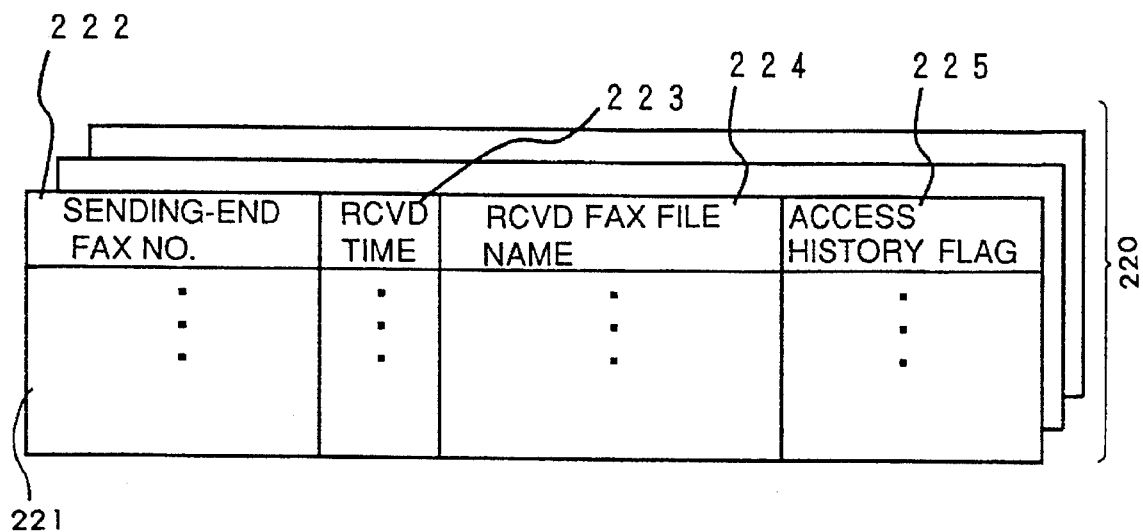
FIG. 4 shows storage areas for storing user separate index files in the embodiment.

FIG. 4 shows user separate index files 220 which are provided separately for individual receiving-end user IDs. One entry or record 221 of one index file 222 is reserved for one received facsimile file 211 stored in the received facsimile file storage area 210, provided that the received facsimile file 211 contains a receiving-end user ID. One index record 221 includes a sending-end facsimile number 222, the time of receipt (the time when receipt was made) 223, a received facsimile file name 223, and an access history flag 225. These items of data 222–224 are set by the facsimile receiving processing program. The access history flag 225 is set by a received facsimile managing program described below. The data items of the record 221 will be described below in detail in connection with the facsimile receiving processing program and the received facsimile managing program.

Figure 5:
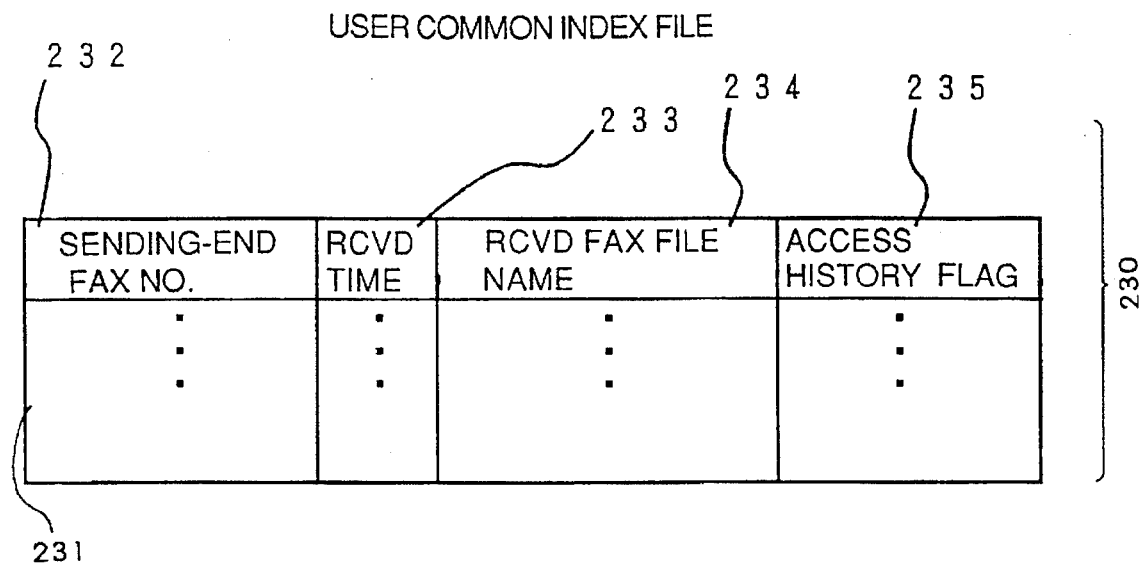
FIG. 5 shows a storage area for storing a common user index file in the embodiment.

Referring next to FIG. 5, there is only one file as a user common index file which is shared by users. This file is used to record data items of a received facsimile file in a record, which are similar to those recorded in the index file 222, when the received facsimile file contains no receiving-end user ID. One record 231 in the user common index file 232 includes a sending-end facsimile number 232, the time of receipt 233, a received facsimile file name 234, and an access history flag 235. These data items of data 232–234 are set by the facsimile receiving processing program while the access history flag 235 is set by the receiving facsimile managing program. The details of the data items in the record 231 will be presented later.

Figure 6:
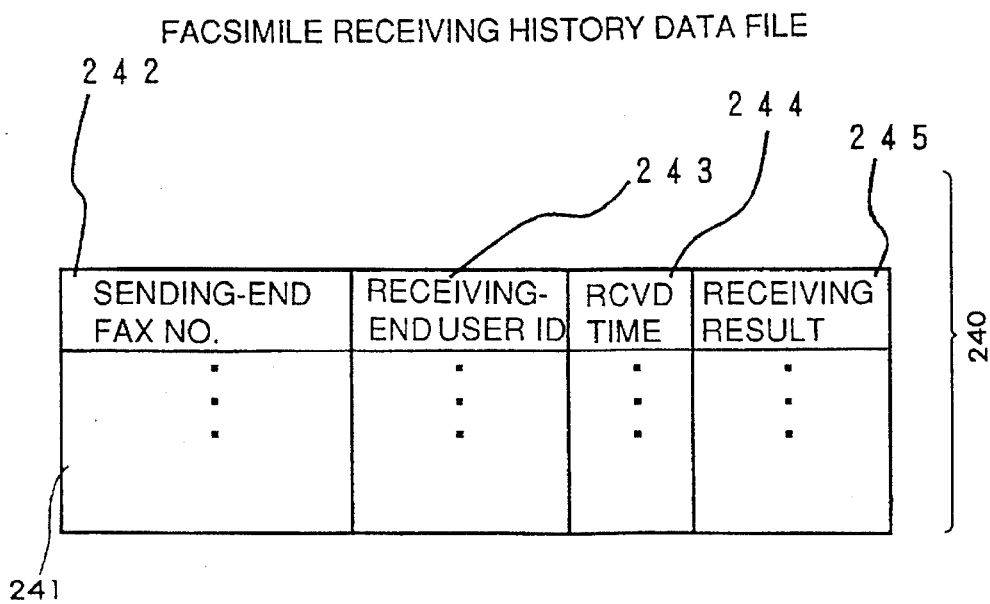
FIG. 6 shows a storage area for storing a data file of a facsimile receiving history in the embodiment.

FIG. 6 shows only one file present in the facsimile server terminal 1 as a facsimile receiving history data file, which serves to record every facsimile receiving process, one record at a time, in the entries thereof. One receiving history record includes a sending-end facsimile number 242, a receiving-end user ID 243, the time of receipt 244, and a result of receiving process 245. These data items 242–245 are set by the facsimile receiving processing program, although their detailed contents will be explained below.

Figure 7:
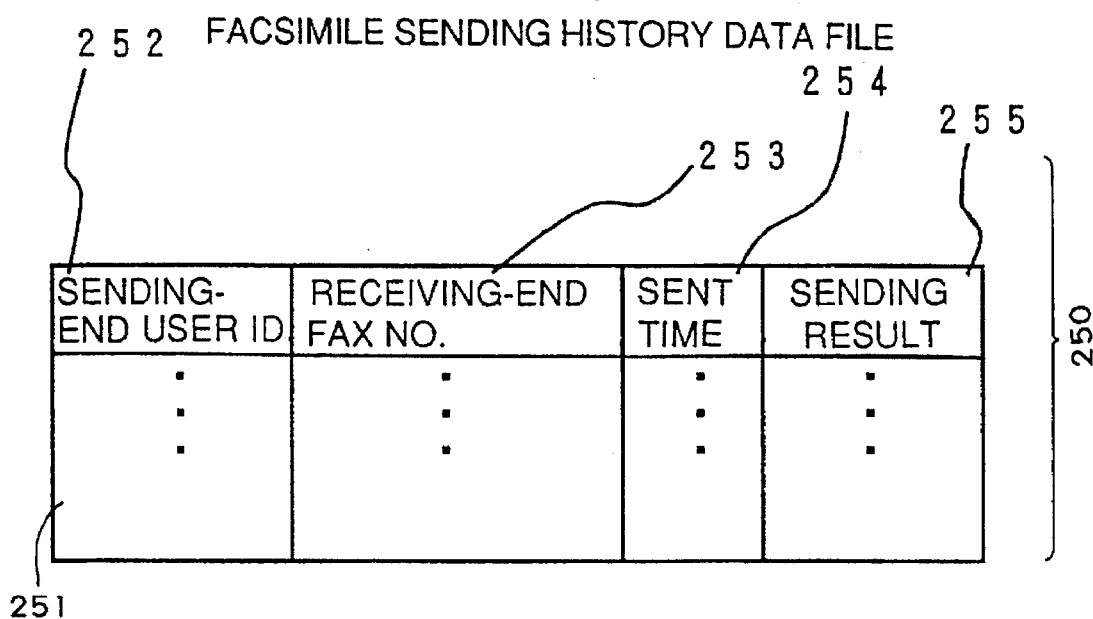
FIG. 7 shows a storage area for storing a data file of a facsimile transmitting history in the embodiment.

FIG. 7 shows only one file present in the terminal 1 as a facsimile sending history data file, which serves to record every facsimile sending process, one record at a time, in the entries thereof. One sending history record 251 includes a sending-end user ID 252 which identifies a user at a sending end, a sending-end facsimile number 253 of a facsimile machine (or facsimile server), the time of transmission (the time when the transmission was made) 254, and a result of sending process 255. These data items 252–255 are set by a facsimile transmission processing program, although their detailed contents will be described below in connection with the facsimile transmission processing program.

Figure 8:
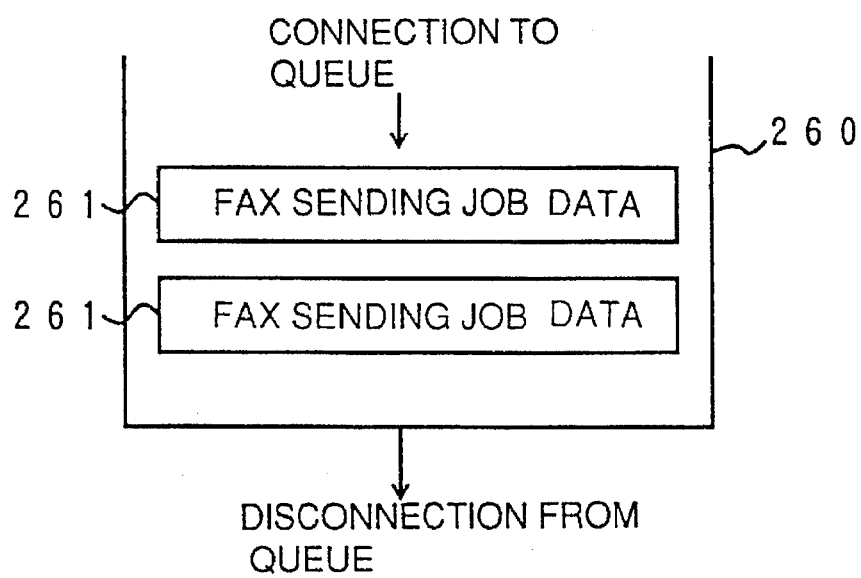
FIG. 8 shows a queue of jobs for facsimile transmission in the embodiment.

Referring to FIG. 8, there is shown a queue 260 of facsimile sending jobs which are managed as sending job data items 261 in a first-in-first-out manner, and which includes a job for sending the response data created by the response creating program, and a job for sending facsimile data requested to be sent from the client terminal 3. The facsimile sending job data items 261 are retrieved by a facsimile transmission processing program as stated below.

Figure 9:
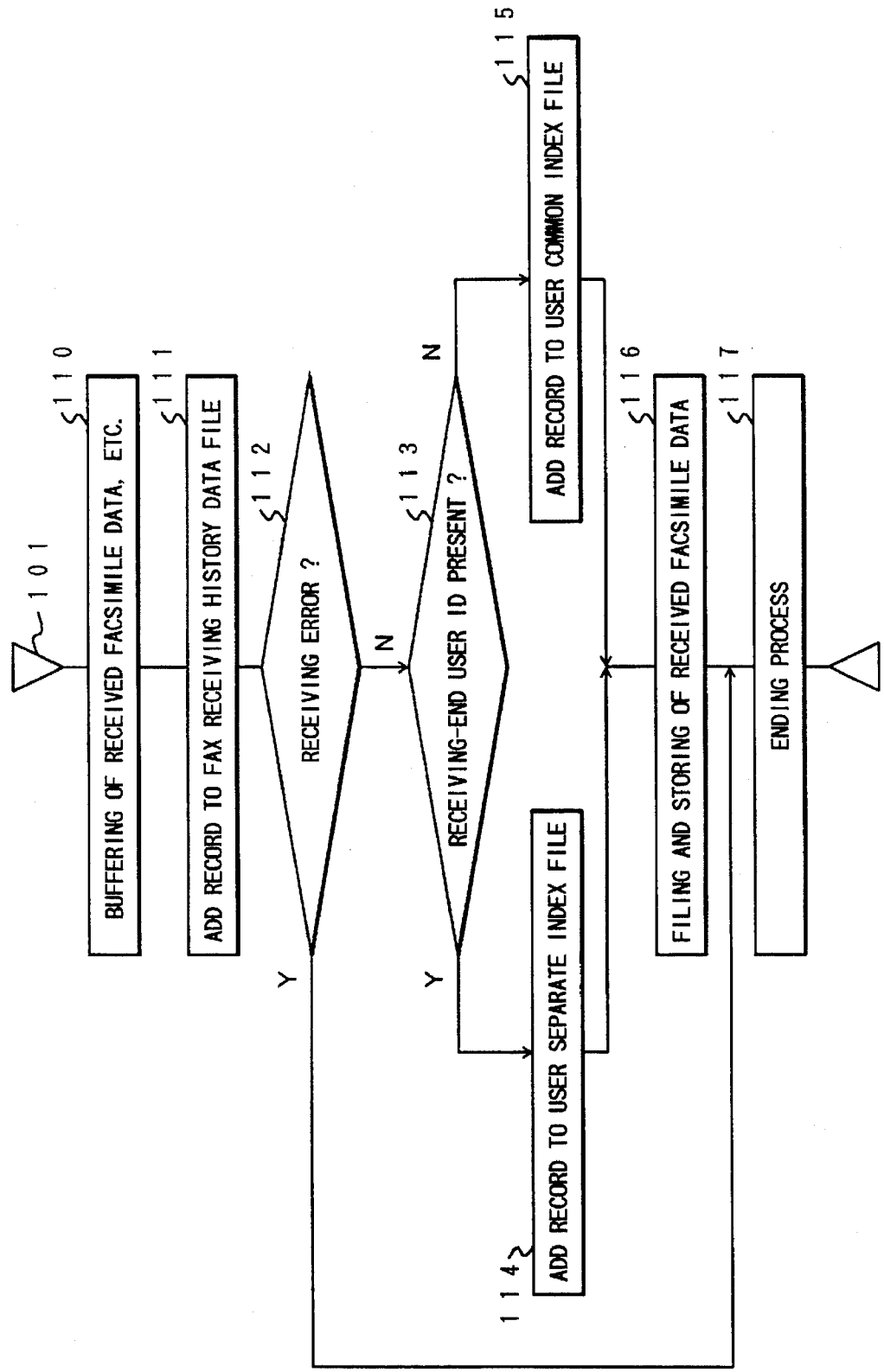
FIG. 9 is a flowchart of a facsimile receiving processing program in the embodiment.

Explained next is the function of the facsimile receiving processing unit 100. Referring to FIG. 9, which shows a flowchart of a facsimile receiving processing program 101, this program is activated by an interrupt process when the modem 16 detects an incoming call on the telephone line.

Upon activation, the facsimile receiving processing program 101, initially, at step 110, stores received facsimile data into a buffer, detects the receiving-end facsimile number and user ID, and controls the network control, including connection/disconnection of the call.

Incidentally, the buffer for storing the received facsimile data is temporary storage which can be reserved in the main memory 11a or in the HD 13a. Conventional approaches to send the sending-end facsimile number and the receiving-end user ID include utilization of an optical mark reader (OMR) sheet, utilization of the push button (PB) signal after connection of the network, and utilization of a facsimile information field (FIF) in a facsimile communication procedure. The step 110 serves to detect the sending-end facsimile number and the receiving-end user ID in a way corresponding to at least one of these approaches.

Next, in step 111, one record 241 associated with the receiving process in the step 110 is added into the facsimile receiving history data file 240. In this event, the sending-end facsimile number 242 and the receiving-end user ID 243, in the record 241, are respectively loaded with the sending-end facsimile number and the receiving-end user ID both detected in step 110. If either of the data items were not detected in step 110, the corresponding part of the record 241 is filled with a NULL symbol, which indicates that no data is available. Also, the time of receipt 244 is loaded with the date and time obtained from the timer device 17a, while the result of receiving process 245 is loaded with the result of the receiving process in step 110, for example, NORMAL (successfully resulted), ERROR (network error), etc.

Subsequently, in step 112, the result of the receiving process in step 110 is checked to see whether or not an error has occurred. If no error is detected, control proceeds to step 113 whereas if an error is detected, control jumps to step 117.

In step 113, presence or absence of the receiving-end user ID is checked. If it is detected, control proceeds to step 114, and if not, to step 115.

In step 114, one index record associated with the receiving process in step 110 is loaded into one entry in one of the user separate user index files 220 which corresponds to the receiving-end user ID detected in step 110. In this event, the sending-end facsimile number 222 in the index record 221 is loaded with the sending-end facsimile number detected in step 110. If no sending-end facsimile number is detected, the NULL symbol is loaded instead. The time of receipt 223 is loaded with the date and time obtained from the timer device 17a, and the received facsimile file name 224 is loaded with a new file name which is uniquely created based on the information such as the time of receipt 223 or the like. At the same time, the access history flag 225 is loaded with "OFF" which indicates that no access is made yet to that particular received facsimile file.

In step 115, one index record 231 associated with the receiving process in step 110 is added in one entry of the user common index file 230. In this event, the sending-end facsimile number 232 in the index record 231 is loaded with the sending-end facsimile number detected in step 110. If no sending-end facsimile number is detected, the NULL symbol is loaded instead. The time of receipt 233 is loaded with the date and time obtained from the timer device 17a, and the received facsimile file name 234 is loaded with a new file name which is uniquely created based on the information such as the time of receipt 223 or the like. At the same time, the access history flag 225 is loaded with OFF.

In the next step 116, a new file 211 is created in the received facsimile file storage area 210, with the new name 234 created in step 114 or 115, and then the received file data, stored in the buffer in step 110, is copied into the new received facsimile file 211.

Finally in step 117, an ending process is conducted, such as releasing the buffer area reserved for the received facsimile data in step 110.

As mentioned above, the facsimile receiving processing program 101 allows the facsimile server terminal 1 to store received facsimile data into the data storage area 200 in a file-by-file manner, while the received facsimile files, with the receiving-end user IDs, being classified into separate groups by the user ID, and the received facsimile files with no such user IDs being gathered together in one group. In either case, each received facsimile file is managed in correspondence with the sending-end facsimile number, the time of receipt, etc. as stated above.

With this arrangement, the received facsimile flies 211 can be retrieved by using the received facsimile file names, 224 and 234, defined in the user separate index files 220 and the user common index file 230, respectively.

Figure 10:
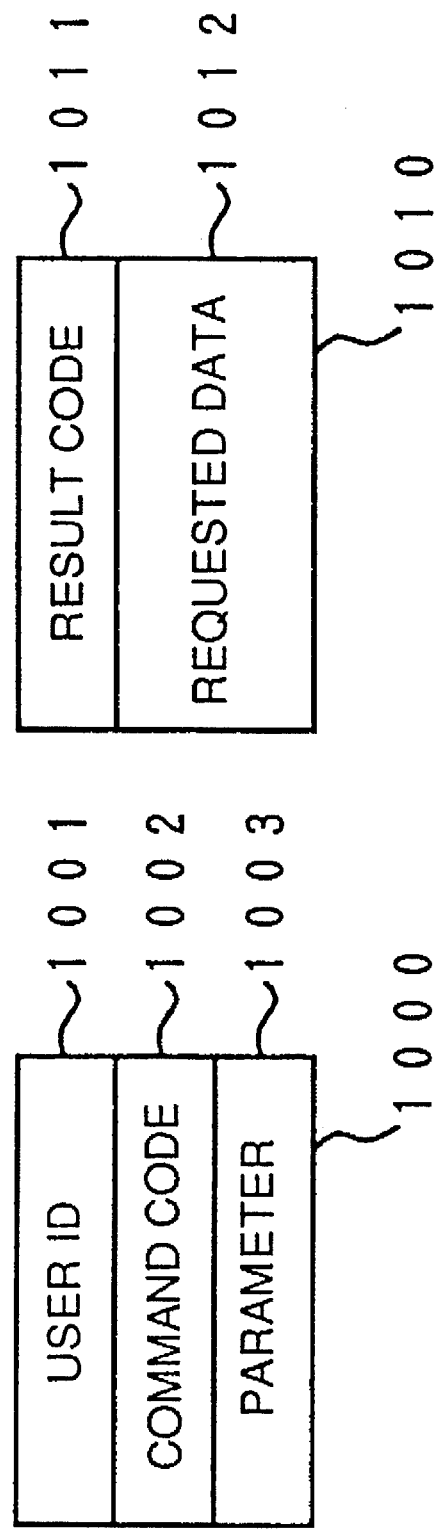
FIGS. 10A and 10B show control data exchanged between a received facsimile manager and a received facsimile accessing unit in the embodiment.

Referring now to FIG. 10A and 10B, control data exchanged between the received facsimile manager 300 and the received facsimile accessing unit 400 is explained hereinafter.

In FIG. 10A, client's command data 1000 is transferred from the client terminal 3 through the LAN board 14b, LAN 4 and LAN board 14a to the facsimile server terminal 1, for carrying a request for service from the received facsimile accessing unit 4500 to the received facsimile manager 300. The client command data 1000 comprises a (receiving-end) user ID 1001, a command code 1002, and a parameter 1003. The command code 1002 may include codes to request various processes, such as displaying a list of, transferring, deleting, and printing received facsimile files, offered by the received facsimile file managing program (explained in detail below). The parameter 1003 is loaded with a parameter such as the name of a received facsimile file to be handled.

In FIG. 10B, facsimile server response data 1010 is transferred from the facsimile server terminal 1 through the LAN board 14a, LAN 14 and LAN board 14b to the client terminal 3, for carrying a response such as the result of processing from the received facsimile file manager 300 to the received facsimile accessing unit 400. The facsimile server response data 1010 comprises a result code 1011 and requested data 1012. The result code 1011 is a code indicating a result of the process of the received facsimile file manager 300, such as whether the process has successfully resulted or not. Two or more codes may be simultaneously set as the result code 1011. The requested data 1012 contains a body of the received facsimile file, a transfer of which was requested from the received facsimile file accessing unit 400.

Figure 11:
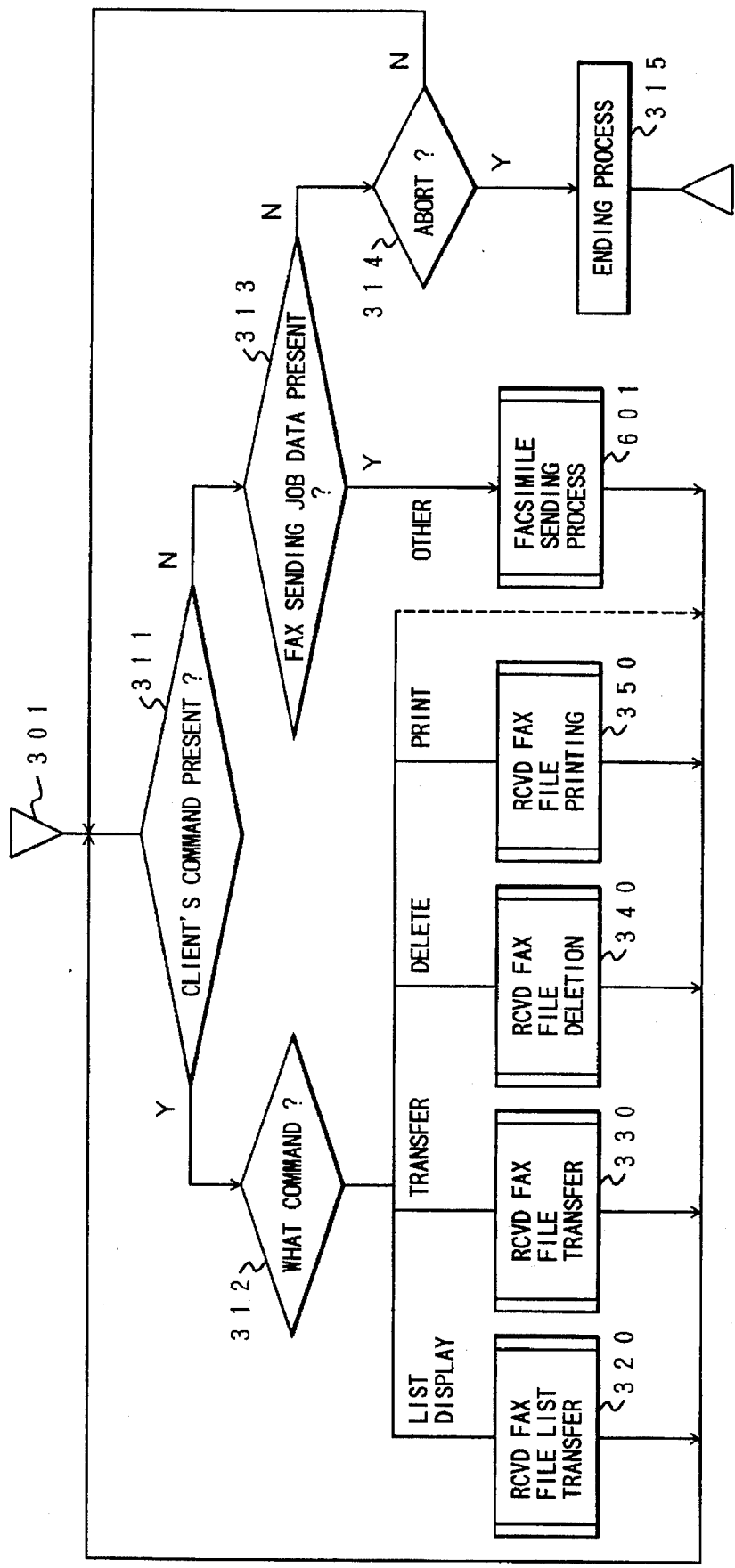
FIG. 11 is a flowchart of a program for managing received facsimile data.

Referring next to FIG. 11 which shows a flowchart of a received facsimile managing program, an explanation will be given hereinafter of this program, which achieves the function of the received facsimile manager 300. The received facsimile managing program is periodically activated after the power on of the facsimile server terminal 1.

Upon activation, initially, in step 311, it is determined whether or not a user's command is presented from the client terminal 3 via the LAN 4. If it is presented, i.e. the client's command data 1000 has been entered, step 312 is taken as a next step whereas if it is not, step 313 is taken. In step 312, the command code 1002 in a given client's command data 1000 is examined. If it indicates a process for displaying the received facsimile file list, control proceeds to step 320. If a file transfer process is indicated, the control proceeds to step 330. If a file deletion process is indicated, control proceeds to step 340, and if a file printing process is indicated, control proceeds to step 350.

The processes of steps 320, 330, 340 and 350 are realized by executing a received facsimile file list transfer processing program, a received facsimile file transfer processing program, a received facsimile file deletion processing program and a received facsimile file print processing program, respectively, each explained in detail below. In step 313, it is checked whether facsimile sending job data 261 is present or not. If present, a facsimile sending process is carried out in step 601, followed by returning back to step 311. The process of step 601 is performed by activating a facsimile transmission processing program explained below. If the facsimile sending job data 261 is not present in step 313, it is checked whether or not an abort is instructed. If so, an ending process is carried out in step 315, terminating this program, and if not, control goes back to step 311.

Figure 12:
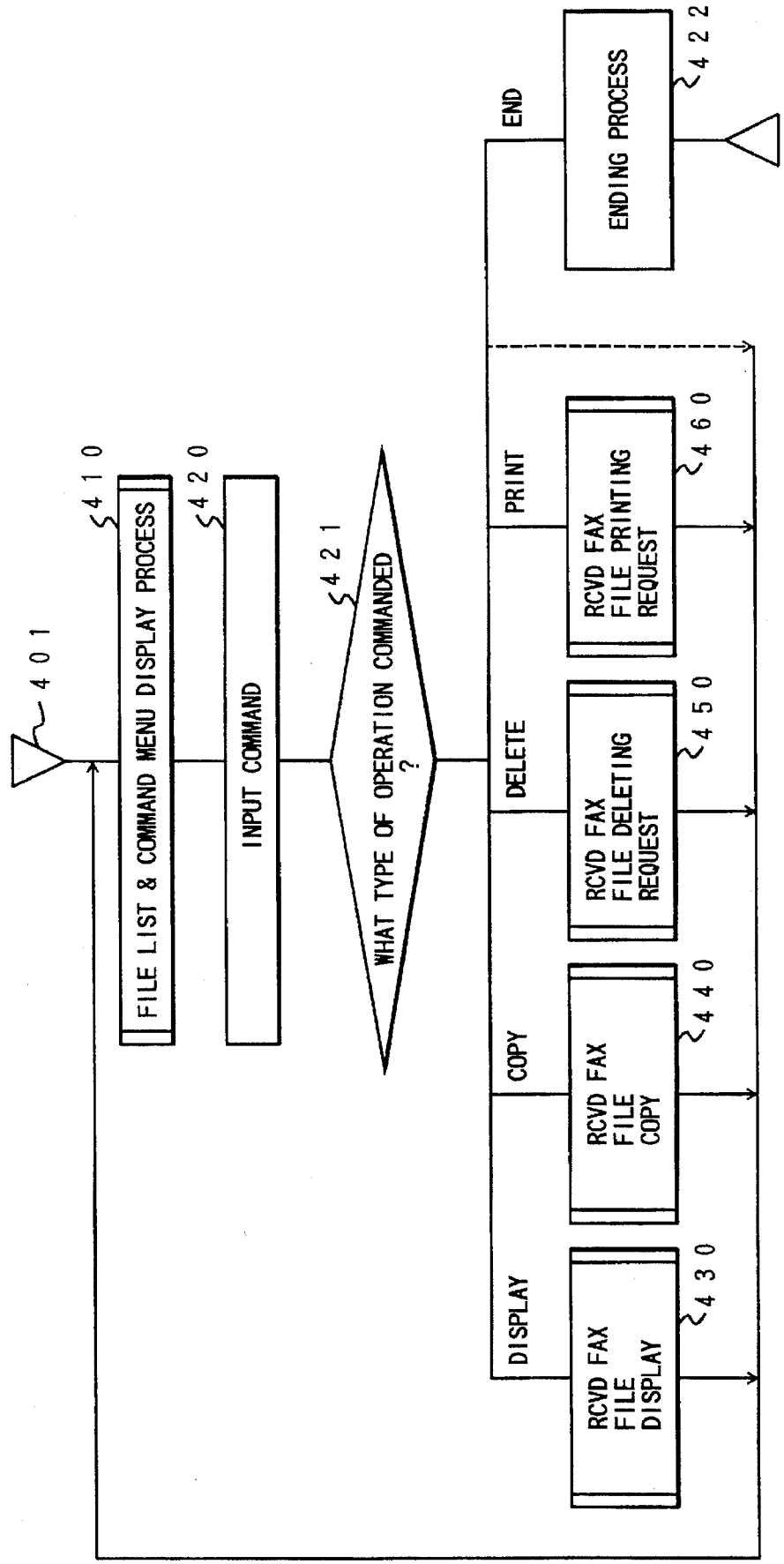
FIG. 12 is a flowchart of a program for accessing received facsimile data.

Referring next to FIG. 12, there is shown a flowchart of a received facsimile accessing program which provides the function of the received facsimile accessing unit 400. This received facsimile accessing program 401 is activated by an activation command which is input from the keyboard 12b of the client terminal 3.

Upon activation, the received facsimile accessing program 401, initially, in step 410, carries out a display process for displaying a received facsimile file list along with a command menu, thereby presenting, on the display 18a, a list of received facsimile files to be accessed, and types of operations offered to the user. This process of step 410 is explained in detail below, referring to a flowchart of a corresponding program. Next, in step 420, a user inputs a command or type of operation from the keyboard 12b and, for some of the commands, specifies one of the received facsimile files to be accessed.

In step 421, the command input from the keyboard 12b is examined. If it indicates display of a received facsimile file, step 430 is selected, and if a copy of a received facsimile file is indicated, step 440 is selected. Similarly, if deletion or printing of a received facsimile file is indicated, step 450 or 460 is selected, respectively. These steps 430–460 are followed by step 410. If the command requests other operation than these, after such an operation is completed control proceeds back to step 410. If the command requests a deletion of a received facsimile file, a prompt may be displayed to confirm the user's intention. The processes of steps 430, 440, 450 and 460 are performed by executing corresponding programs stated below. If the operation instructed in step 420 is a termination of this program 401, an ending process is carried out in step 422 to finish this program.

Figure 14:
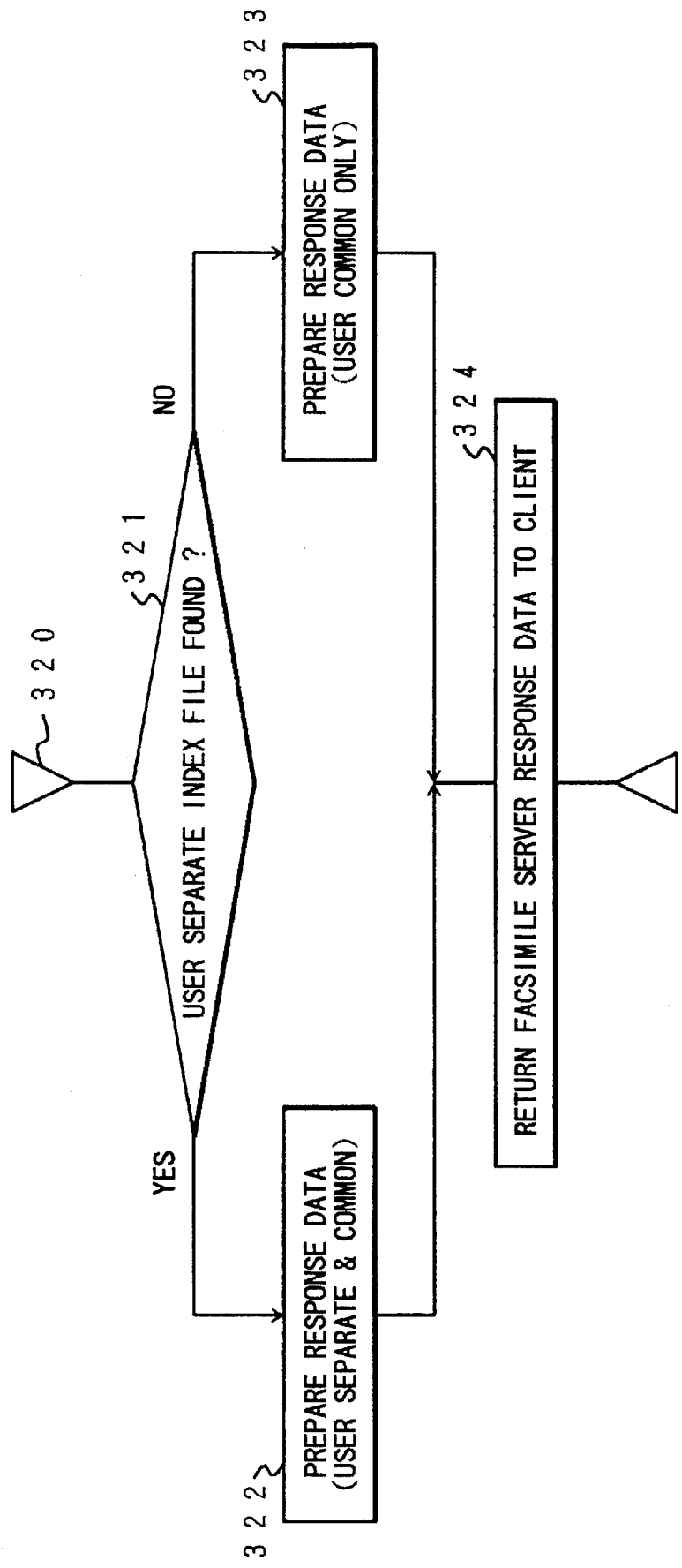
FIG. 14 is a flowchart of a program for transferring a list of received facsimile files.

Referring now to FIG. 14, there is shown a flowchart of a program for transferring a received facsimile file list, a process of which is performed in the facsimile server client 1 and corresponds to step 320 in FIG. 11.

When activated, the program 320 for processing the transfer of a received facsimile file list, initially, in step 321, searches a user separate index file 220, which corresponds to the user ID 1001 contained in the client's command data 100 sent by a display processing program stated below, on the basis of the user ID 1001. If the user separate index file 220 is found, step 322 will follow step 321, and if not, step 323 will follow.

In step 322, a code indicative of a successful retrieval is set in the result code 1011 of the facsimile server response data 1010 (FIG. 10B). The requested data 1012 is loaded with the sending-end facsimile numbers 222, the times of receipt 223 and the received facsimile file names 224 of all the records of the user separate index file 220 retrieved in step 321, and the sending-end facsimile numbers 232, the times of receipt 233 and the received facsimile file names 234 of all the records of the common index file 230. Data indicative of a border is inserted between the two sets of data items of the user separate index file 220 and the user common index file 230 so as to be able to distinguish the two sets of data from each other.

In step 323, the result code 1011 in the facsimile server response data 1010 is loaded with a code representative of an unsuccessful retrieval. The requested data 1012 is loaded with the sending-end facsimile numbers 232, the times of receipt 233 and the received facsimile file names 234 of all the records of the common index file 230.

Finally, in step 324, the facsimile server response data 1010 which were prepared in step 322 or 323 are transferred to the client terminal 3 which is designated by the user ID 1001 in the facsimile server response data 1010, and then this program 320 is terminated.

Figure 15:
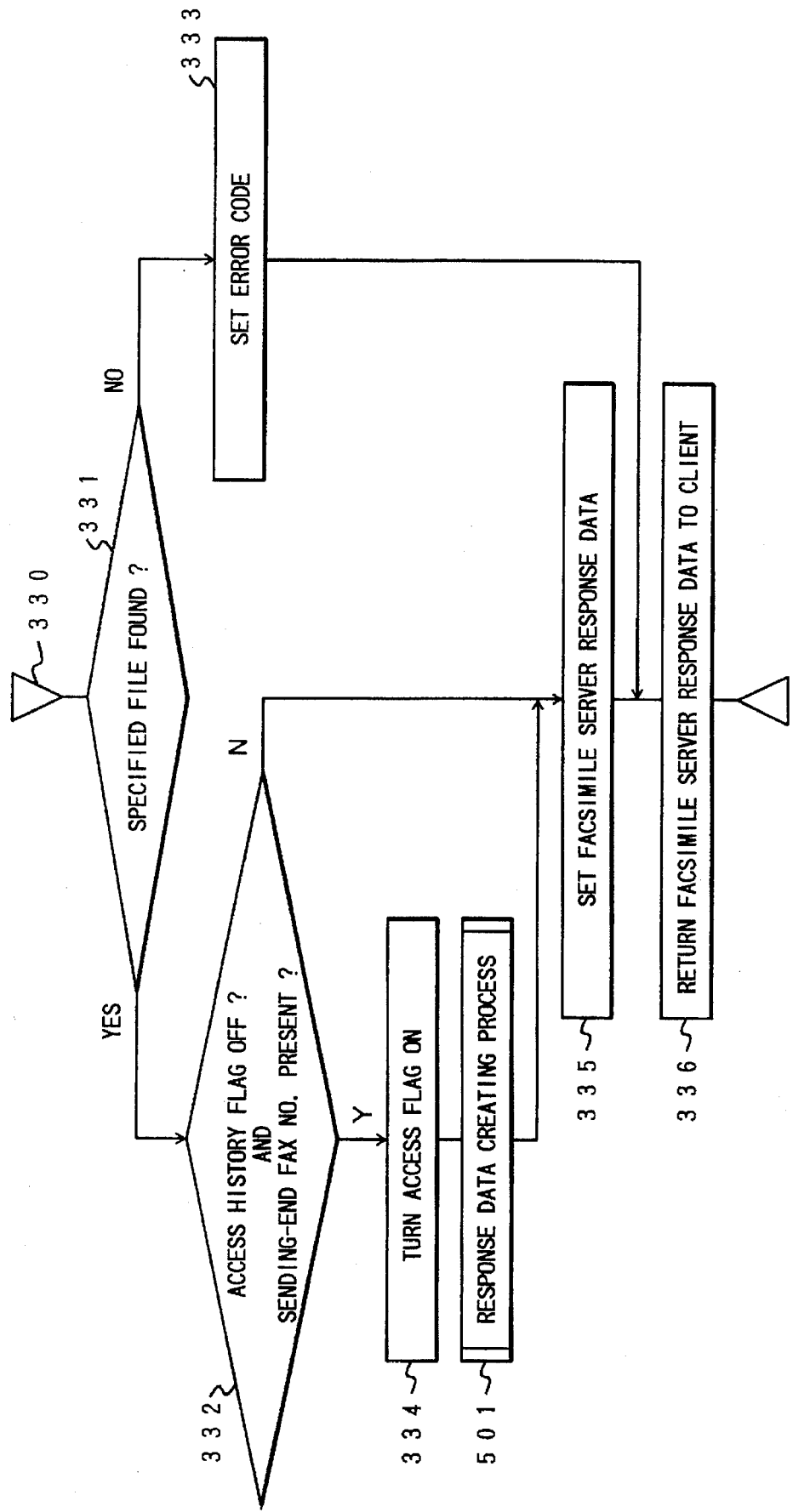
FIG. 15 is a flowchart of a program for transferring a received facsimile file.

Referring next to FIG. 15, there is shown a flowchart of a program for processing transfer of a received facsimile file, the process of which is performed in the facsimile server client 1 and corresponds to step 330 in FIG. 11.

Upon activation, the received facsimile file transfer processing program 330, initially, in step 331, searches an index record 231 in the common index file 230 based on the received facsimile file name placed in the parameter 1003 of the client's command data 1000, which was sent by a received facsimile file display processing program or a received facsimile file copy processing program. When a user separate index file 220 is present, corresponding to a user ID contained in the user ID 1001 of the client's command data 1000, an index record 221 in the user separate index file 220 is also searched. If this file search is successful, step 331 is followed by step 332, and if not, it is followed by step 333. In step 333, the result code 1011 in the facsimile server response data 1010 is loaded with a code indicative of an unsuccessful search of the file, and the requested data 1012 is loaded with NULL indicative of no available data. Then, control jumps to step 336.

In step 332, by referring to the access history flag 235 in the index record 231 (or the access history flag 235 in the index record 221) and the sending-end facsimile number 232 (or 222), it is examined whether or not the access history flag 235(or 225) is set to OFF, and whether or not the sending-end facsimile number 232 (or 222) is loaded with an effective facsimile number. If these conditions are satisfied, the access history flag 235 (or 225) is turned ON in step 334, and a response data creating program (explained in detail below) is executed in step 501, followed by step 335. In this event, a code indicating that this call is issued from the received facsimile file transfer processing program 330 is passed as a caller parameter to the response data creating program. The caller parameter indicates from which of the programs 330, 340 or 350 (explained below) the response data creating program is called.

If the conditions given in step 332 are not met, control proceeds to step 335, in which the result code 1011 is loaded with a code indicative of a successful search. Also, on the basis of the received facsimile file name 234 in the index record 231 (or file name 224 in the index record 221), a received facsimile file 211 stored in the received facsimile file storage area 210 is searched, and then the requested data 1012 of the facsimile server response data 1010 is loaded with the content (body of data) of the retrieved facsimile file 211.

Finally, in step 336, the facsimile server response data 1010 prepared in step 333 or 335 is transferred to the client 3, which corresponds to the user designated by the user ID 1001 in the client's command data 1000, thus terminating the process of the received facsimile file transfer processing program 330.

Figure 16:
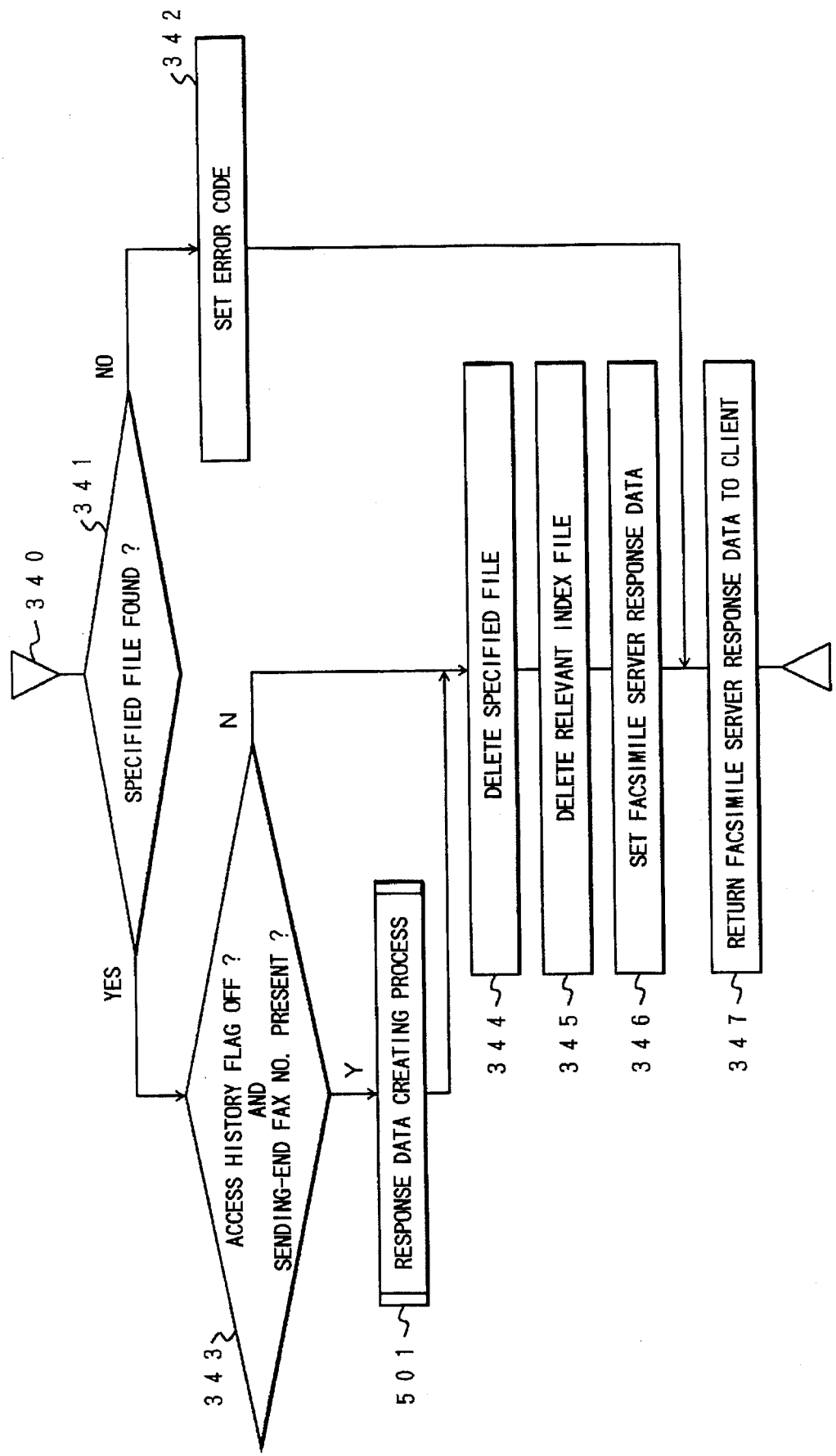
FIG. 16 is a flowchart of a program for deleting a received facsimile file.

FIG. 16 is a flowchart of a received facsimile file deletion processing program 340 which is executed in the facsimile server client 1 and realizes the process in step 340 in FIG. 11.

Upon activation, the received facsimile file deletion processing program 340, initially, in step 341, searches an index record 231 in the user common index file 230 based on the received facsimile file name placed in the parameter 1003 of the client's command data 1000 which was sent by a received facsimile file deletion requesting program. When a user separate index file 220 is present corresponding to a user ID contained in the user ID 1001 of the client's command data 1000, an index record 221 in the user separate index file 220 is also searched. If this file search is successful, step 341 is followed by step 343, and if not, it is followed by step 342.

In step 343, the result code 1011 in the facsimile server response data 1010 is loaded with a code indicative of an unsuccessful search of the file, and the requested data 1012 is loaded with NULL indicative of no available data. Then, control jumps to step 347.

In step 343, by referring to the access history flag 235 in the index record 231 (or the access history flag 235 in the index record 221) and the sending-end facsimile number 232 (or 222), it is examined whether or not the access history flag 235(or 225) is set to OFF and whether or not the sending-end facsimile number 232 (or 222) is loaded with an effective facsimile number.

If the conditions given in step 242 are met, a response data creation program (explained below) is executed in step 501 which is followed by step 344. In this event, a code indicative of a call from the received facsimile file deletion processing program 340 is passed as a caller parameter to the response data creating program.

If the conditions in step 343 are not met, a process in step 344 is effected in which one of the received facsimile files 211 is searched based on the received facsimile file name 234 in the index record 231 (or the file name 234 in the index record 231), and the retrieved facsimile file 211 is deleted. In step 245, the relevant index record 221 (or 231) is also deleted.

Next, in step 346, the result code 1011 in the facsimile server response data 1010 is loaded with a code indicative of a successful search, together with a code indicative of the result of deletion conducted in steps 344 and 345. The requested data 1012 is loaded with a NULL symbol.

Finally, in step 347, the facsimile server response data 1010 prepared in step 342 or 346 is sent to the client 3 whose user is specified by the user ID 1001 contained in the client's command data 1000, terminating the process of the received facsimile file deletion processing program 340.

Figure 17:
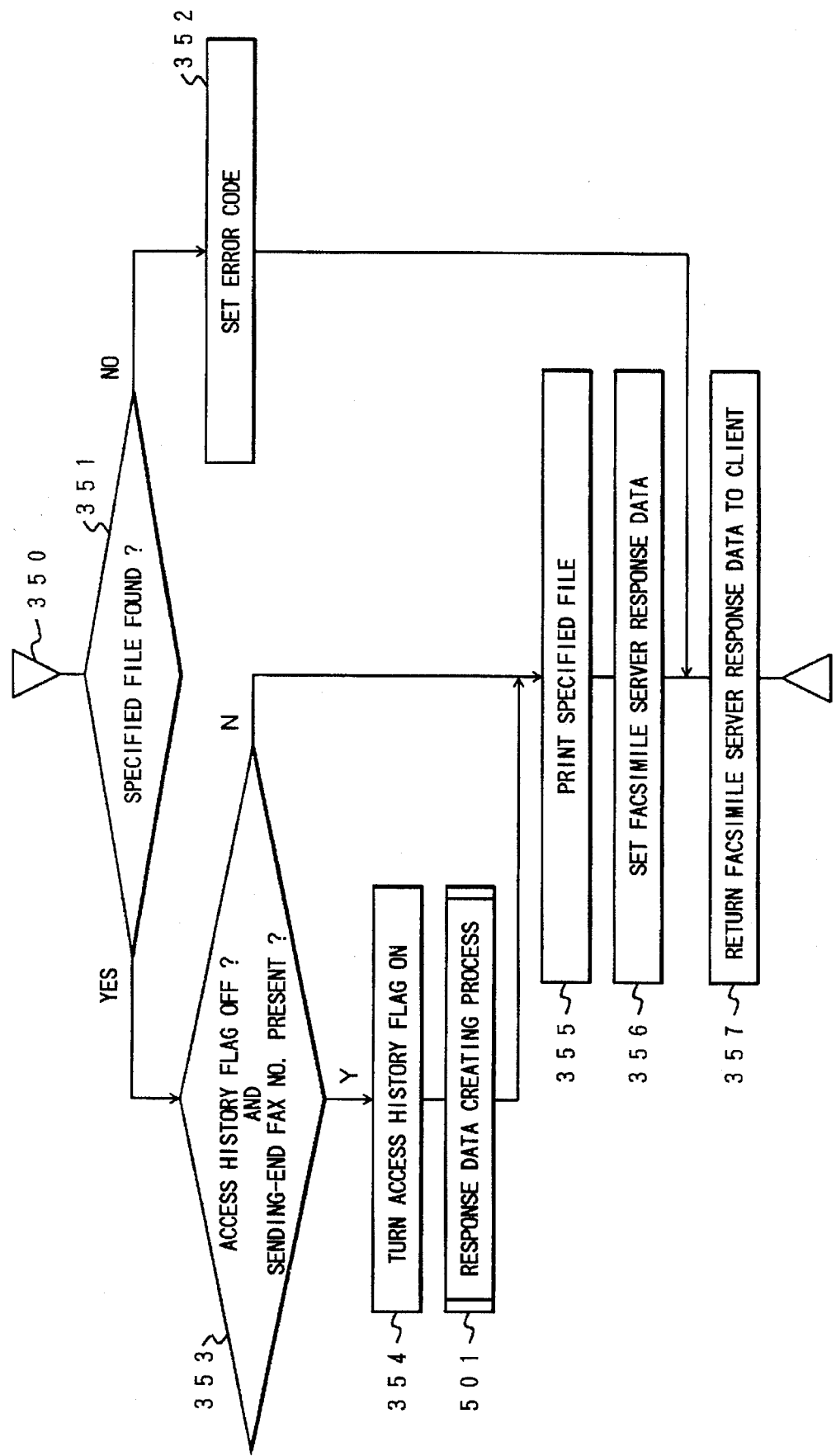
FIG. 17 is a flowchart of a program for printing a received facsimile file.

Referring now to FIG. 17, there is shown a flowchart of a program for processing printing of a received facsimile file, the process of which is performed in the facsimile server client 1 and corresponds to step 350 in FIG. 11.

Upon activation, the received facsimile file print processing program 350, initially, in step 351, searches an index record 231 in the common index file 230 based on the received facsimile file name placed in the parameter 1003 of the client's command data 1000, which was sent by a received facsimile file print requesting program. When a user separate index file 220 is present corresponding to a user ID contained in the user ID 1001 of the client's command data 1000, an index record 221 in the user separate index file 220 is also searched. If this file search is successful, step 351 is followed by step 353, and if not, it is followed by step 352.

In step 352, the result code 1011 in the facsimile server response data 1010 is loaded with a code indicative of an unsuccessful search of the file, and the requested data 1012 is loaded with NULL, indicative of no available data. Then, control jumps to step 357.

In step 353, by referring to the access history flag 235 in the index record 231 (or the access history flag 235 in the index record 221) and the sending-end facsimile number 232 (or 222), it is examined whether or not the access history flag 235(or 225) is set to OFF and whether or not the sending-end facsimile number 232 (or 222) is loaded with an effective facsimile number.

If these conditions are satisfied, the access history flag 235 (or 225) is turned ON in step 334, and a response data creating program (explained in detail below) is executed in step 501, followed by step 355. In this event, a code indicative of a call from the received facsimile file transfer processing program 330 is passed as a caller parameter to the response data creating program.

If the conditions given in step 353 are not met, a process in step 355 is effected, in which one of the received facsimile files 211 is searched based on the received facsimile file name 234 in the index record 231 (or the file name 234 in the index record 231), and the retrieved facsimile file 211 is printed out on the printer 15a.

Next, in step 356, the result code 1011 in the facsimile server response data 1010 is loaded with a code indicative of a successful search, together with a code indicative of the result of the printing process conducted in step 355. The requested data 1012 is loaded with a NULL symbol.

Finally, in step 347, the facsimile server response data 1010 prepared in step 352 or 356 is sent to the client 3 whose user is specified by the user ID 1001 contained in the client's command data 1000, terminating the process of the received facsimile file print processing program 350.

Incidentally, in the present embodiment, the received facsimile file is printed on the printer 15a at the facsimile server terminal 1, and therefore, in order to conduct the printing at the client terminal 3, the received facsimile file is first copied into the client terminal 3 and then the copied file is printed on the printer 15b.

Figure 18:
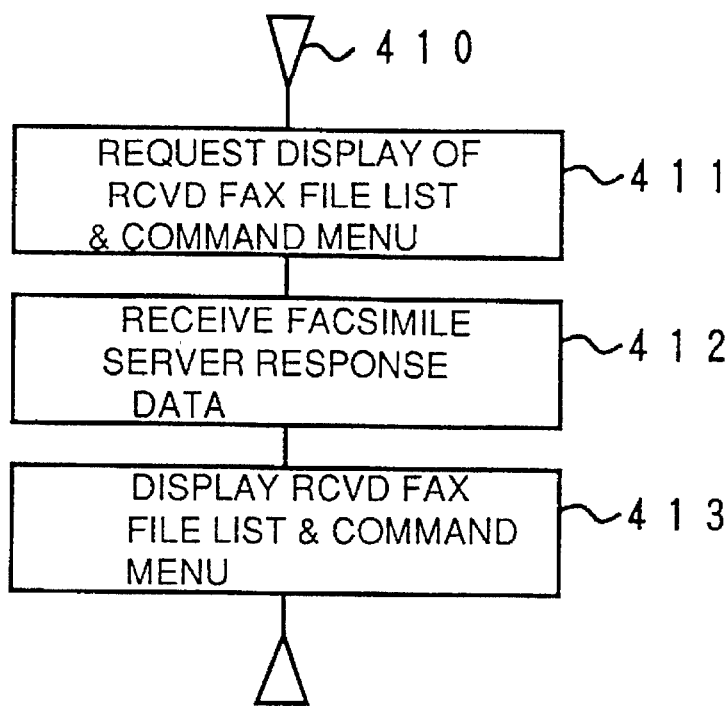
FIG. 18 is a flowchart of a program for displaying a list of the received facsimile files with an operation menu.

FIG. 18 is a flowchart of a program 410 for displaying a list of received facsimile files along with a command menu, which is executed in the client terminal 3, and which realizes the process of step 410 in FIG. 12.

This program 410, when activated, initially, in step 411, loads the user ID 1001 in the client's command data 100 with the user ID which has been entered by a user in the power-on process of the client terminal 3, and the command code 1002 is loaded with a code for this display process of the received facsimile file list. Then, the client's command data 1000 is sent to the facsimile server terminal 1 to request a display of the list of the index files 220 and 230. Then, in step 412, the client terminal 3 receives the facsimile server response data 1010, sent from the facsimile server terminal 1 by means of the program 320, thereon. Finally, in step 413, as shown in FIG. 13 the display device 18b displays an operation menu including function names offered to the user, such as display, copy, deletion and print of a received facsimile file, together with all of the data items contained in the requested data 1012, such as the received facsimile file names, the sending-end facsimile numbers, the time of receipt, and thus this program 410 is terminated.

Figure 19:
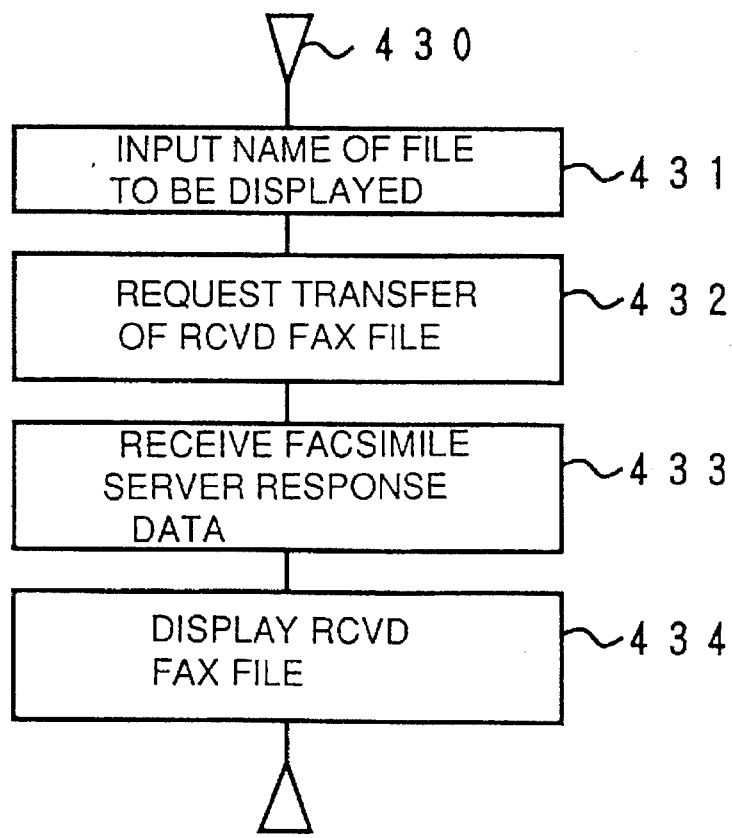
FIG. 19 is a flowchart of a program for displaying a received facsimile file.

FIG. 19 is a program for displaying a received facsimile file, which is executed in the client terminal 3 and realizes the process of step 430 in FIG. 12.

Upon activation, the received facsimile file display processing program 430, initially, in step 431, prompts the user to enter a name of a received facsimile file to be displayed, to receive the file name via the keyboard 12b. In step 432, the user ID 1001 in the client's command data 100 is loaded with a user ID entered by the user in the power-on process of the client terminal 3, while the command code 1002 is loaded with a code indicative of a transfer of a received facsimile file, the parameter 1003 being loaded with a name of a received facsimile file entered in step 431. Then, the thus prepared client's command data 1000 is sent to the facsimile server terminal 1 to request the transfer of the received facsimile file specified by the user. In step 433, the client terminal 3 receives facsimile server response data 1010 sent from the server terminal 1 by means of the transfer processing program 330 thereon. In step 434, the display device 18b displays the body of data of the received facsimile file contained in the requested data 1012 of the facsimile server response data 1010, and then this program 430 is terminated. Incidentally, if a NULL symbol is set in the result code 1011 of the facsimile server response data 1010, an error message expressing the same is presented on the display 18b.

Figure 20:
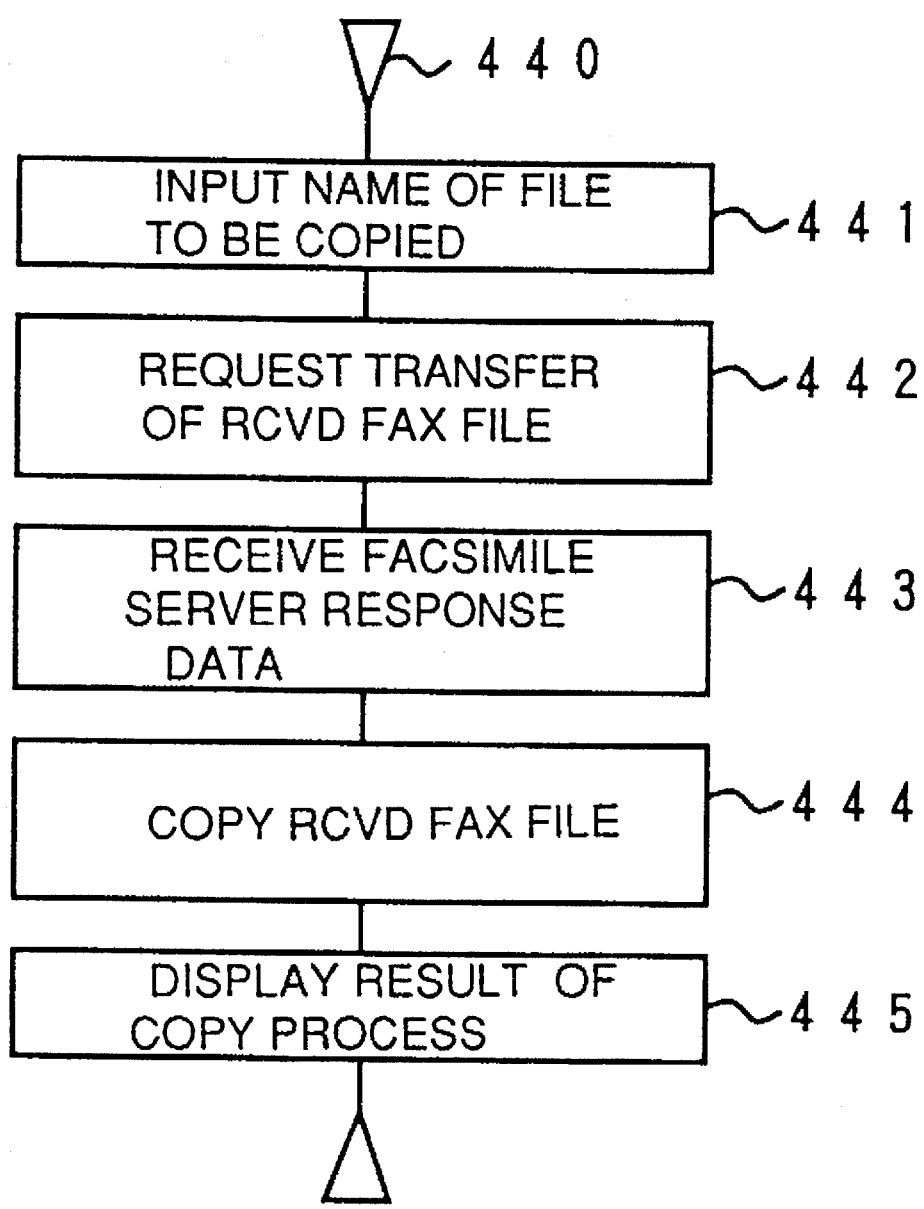
FIG. 20 is a flowchart of a program for copying a received facsimile file.

Referring to FIG. 20, there is shown a flowchart of a program for copying a received facsimile file, which is executed at the client terminal 3 and corresponds to step 440 in FIG. 12.

Upon activation, the received facsimile file copy processing program 440, initially, in step 441, prompts the user to enter a name of a received facsimile file via the keyboard 12b, so as to receive this specified file name. In step 442, the user ID 1001 in the client's command data 100 is loaded with a user ID entered by the user in the power-on process of the client terminal 3, while the command code 1002 is loaded with a code indicative of a transfer of a received facsimile file, the parameter 1003 being loaded with a name of a received facsimile file entered in step 441. Then, the thus prepared client's command data 1000 is sent to the facsimile server terminal 1 to request the transfer of the received facsimile file specified by the user. In step 443, the client terminal 3 receives facsimile server response data 1010, sent from the server terminal 1 by means of the transfer processing program 330, thereon. In step 444, the body of data of the received facsimile file contained in the requested data 1012 of the facsimile server response data 1010 is stored as a file in the hard disk drive 13b of the client terminal 3. Then, in step 445, a message corresponding to the result code 1011 is presented on the display 18b as the result of the copy process, and this program 440 is terminated. Incidentally, if a NULL symbol is set in the result code 1011 of the facsimile server response data 1010, no operation is conducted in step 444.

Figure 21:
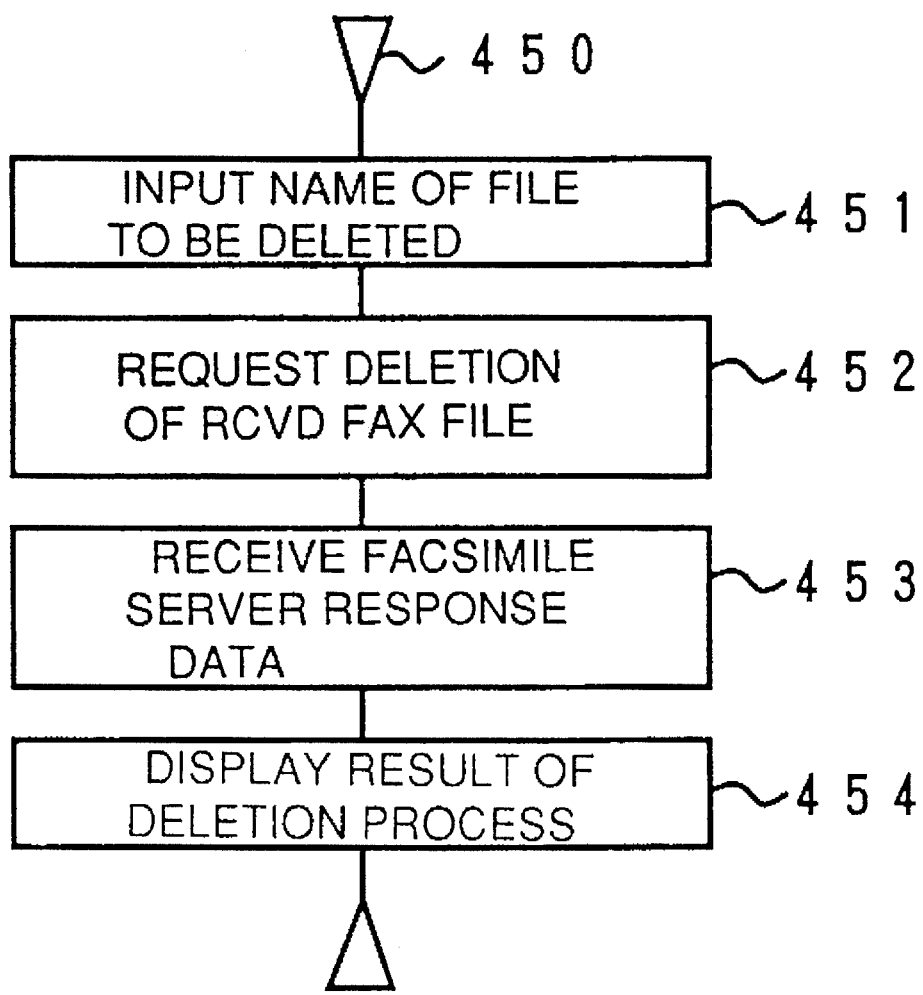
FIG. 21 is a flowchart of a program for requesting the deletion of a received facsimile file.

FIG. 21 shows a program for requesting deletion of a received facsimile file, which is executed in the client terminal 3 and realizes the process of step 450 in FIG. 12.

Upon activation, the received facsimile file deletion requesting program 450, initially, in step 451, prompts the user to enter a name of a received facsimile file to be deleted, so as to receive the file name via the keyboard 12b. In step 452, the user ID 1001 in the client's command data 100 is loaded with a user ID entered by the user in the power-on process of the client terminal 3, while the command code 1002 is loaded with a code indicative of a deletion of a received facsimile file, the parameter 1003 being loaded with a name of a received facsimile file entered in step 451. Then, the thus prepared client's command data 1000 is sent to the facsimile server terminal 1, to request the deletion of the received facsimile file specified by the user. In step 453, the client terminal 3 receives facsimile server response data 1010 sent from the server terminal 1 by means of the deletion processing program 340 thereon. In step 454, a message corresponding to the result code 1011 is presented on the display 18b as the result of the deletion process, and this program 450 is terminated.

Figure 22:
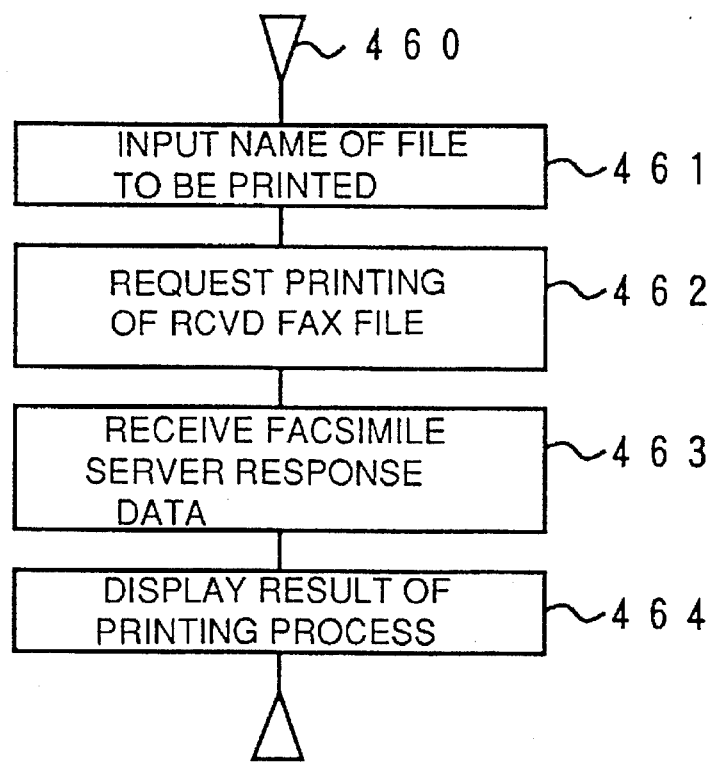
FIG. 22 is a flowchart of a program for requesting the printing of a received facsimile file.

FIG. 22 is a program for requesting printing of a received facsimile file, which is executed in the client terminal 3 and realizes the process of step 460 in FIG. 12.

Upon activation, the received facsimile file print requesting program 460, initially, in step 461, prompts the user to enter a name of a received facsimile file to be printed, so as to receive the file name via the keyboard 12b. In step 462, the user ID 1001 in the client's command data 100 is loaded with a user ID entered by the user in the power-on process of the client terminal 3, while the command code 1002 is loaded with a code indicative of a printing of a received facsimile file, the parameter 1003 being loaded with a name of a received facsimile file entered in step 461. Then, the thus prepared client's command data 1000 is sent to the facsimile server terminal 1 to request the printing of the received facsimile file specified by the user. In step 463, the client terminal 3 receives facsimile server response data 1010 sent from the server terminal 1 by means of the print processing program 350 thereon. In step 464, a message corresponding to the result code 1011 is presented on the display 18b as the result of the printing process, and this program 460 is terminated.

As discussed herein before, by using the received facsimile managing program 301, the received facsimile accessing program 401, the programs activated by the programs 310, 401 and the associated data, the user of the client terminal 3 is capable of displaying, copying, deleting and printing a received facsimile data file which was received in the facsimile server terminal 1.

Figure 23:
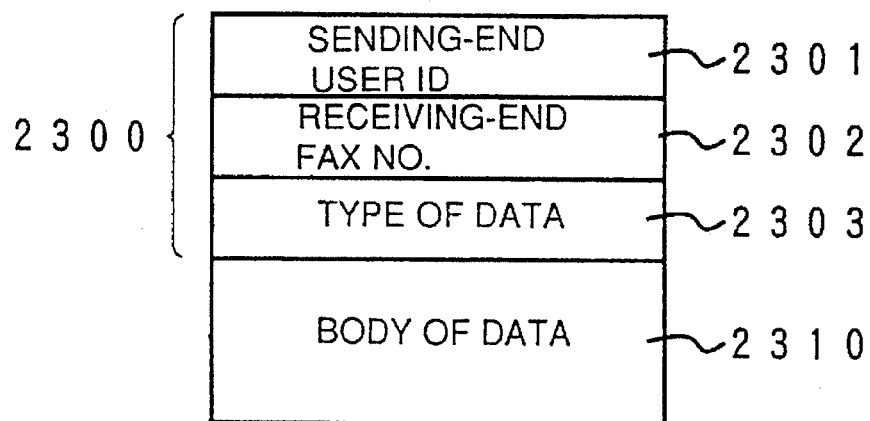
FIG. 23 shows a data structure for a facsimile sending job.

Referring now to FIG. 23, a data structure of facsimile sending job data 261 will be explained. The facsimile sending job data 261 comprises facsimile sending control information 2300 and a data body 2310 of the facsimile data to be sent. The control information 2300 comprises a sending-end user ID 2301, a receiving-end facsimile number 2302 and a type of data 2303. The sending-end user ID 2301 is loaded with a user ID of a user who requests a sending of a facsimile or who has accessed a received facsimile file, while the receiving-end facsimile number 2302 is loaded with a receiving-end facsimile number given by the response data creating program or given by the user requesting the sending. Further, the type of data 2303 is loaded with a code indicating whether the body of data 2310 is facsimile data (image data) or text data, etc.

Referring next to FIGS. 24A and 24B, and FIGS. 25A and 25B, explanation is given with respect to the data necessary for the response data creating program. This data is placed in the hard disk drive 13a or the facsimile server terminal 13a.

FIG. 24A shows a file 2400 of telephone numbers (facsimile numbers) outside the LAN. This outside telephone number file 2400 records, in the form of character data, pairs consisting of a facsimile number 2401 and the corresponding name of user 2402, the facsimile number 2401 being assigned to a facsimile machine 5 with which the facsimile server terminal 1 exchanges facsimile data via the telephone line 5.

FIG. 24B shows a file 2420 of telephone numbers (facsimile numbers) inside the LAN. This inside telephone number file 2410 records, in the form of character data, pairs of a user ID 2411 and the corresponding name of user 2412, the user ID 2411 being assigned to a user of the facsimile server terminal 1 or the client terminal 3, etc. in the LAN.

FIG. 25A shows a template format of the response data which is created when a user requests through the client terminal 3 to display, copy or print a received facsimile file. The blank spaces 2501–2505 are loaded with character data or image data by means of the response data creating program. More specifically, the blank 2501 is loaded with one of the names 2402 listed in the outside telephone number file 2400, the blank 2502 is loaded with one of the names 2412 listed in the inside telephone number file 2410, and the blank 2503 is loaded with date/time data at the time when the received facsimile file was accessed, obtained from the timer device 17a. Similarly, the blank 2504 is loaded with a type of access (display, copy, or print), while the blank 2505 is loaded with a part of the received facsimile data (image), such as an upper half of the first or front page thereof.

FIG. 25B shows a template format of the response data which is created when a user requests, through the client terminal 3, to delete a received facsimile file. The blanks 2511–2514 are loaded with character data or image data by the response data creating program, as in the case of FIG. 25A. That is, the blank 2511 is loaded with one of the names 2402 in the outside telephone number file 2400 while the blank 2512 is loaded with one of the names 2412 in the inside telephone number file 2410, the blank 2513 being loaded with date/time data at the time when the received facsimile file was accessed, obtained from the timer device 17a. Similarly, the blank 2514 is loaded with a part of the received facsimile data (image), such as an upper half of the first or front page thereof.

The template formats 2500 and 2510 are stored in the hard disk drive 13a of the facsimile server terminal 1.

Figure 26:
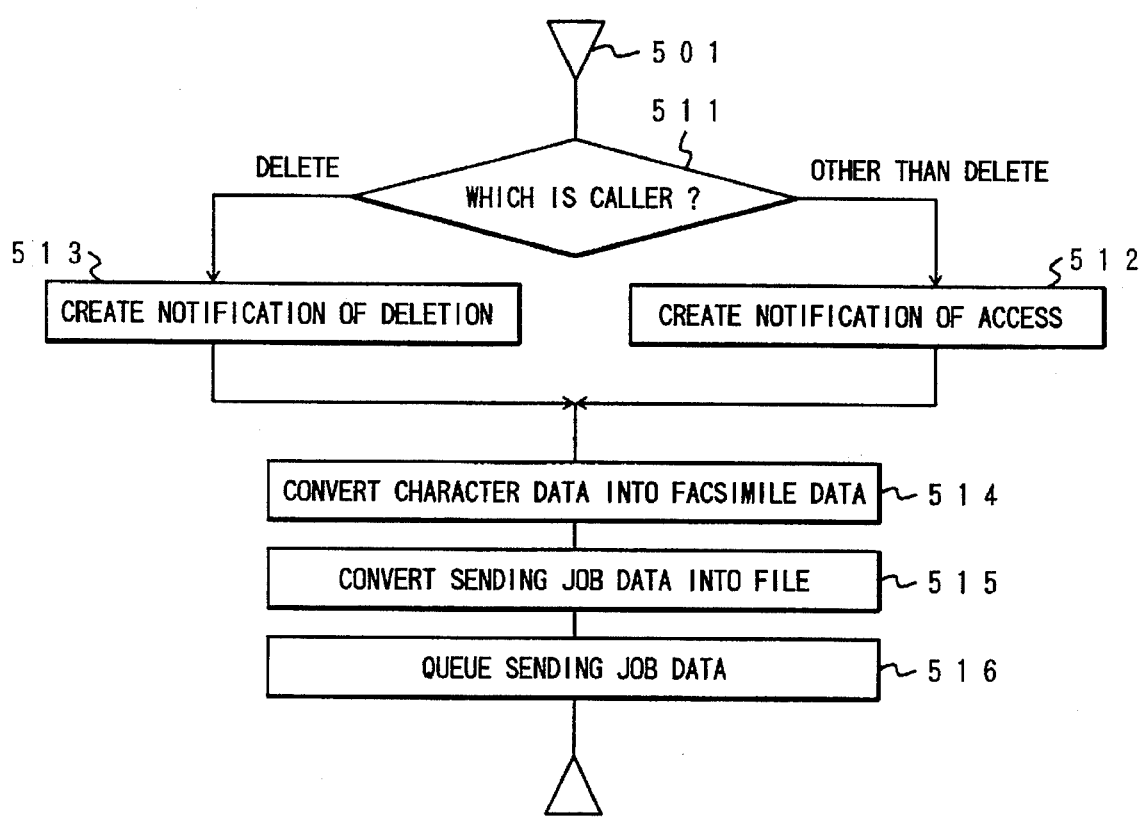
FIG. 26 shows another template format of the response data.

Referring next to FIG. 26, there is shown a flowchart of a program for creating response data, which offers the function of the response data creating unit 500.

A response data creating program 501 is activated by the processes of the received facsimile file transfer processing program 330, the received facsimile file deletion processing program 340 and the received facsimile file print processing program 350.

Upon activation, the response data creating program 501, initially, in step 511, examines the caller parameter which is passed at the time of activation. If the caller parameter indicates that this activation is caused by the received facsimile file deletion processing program 340, step 513 is selected as the next step to be taken, and otherwise, step 512 is selected.

In step 512, the blanks 2501–2504 of the template format 2500 are loaded with relevant character data, followed by step 514. Specifically, one of the index records 231 (or 221) is, initially, searched from within the common index file 230 (or separate index file 221) on the basis of the name of a received facsimile file to be accessed. Then, the sending-end facsimile number placed in the thus obtained index record is compared with the facsimile numbers 2401 recorded in the outside telephone number file 2400. If there is a match, the blank 2501 in the template format 2500 is loaded with the user name 2402 corresponding to the matched facsimile number 2401. If there is no match, the sending-end facsimile number 232 (or 222) itself is put into the blank 2501. The user ID 1011 of a user who has accessed a received facsimile file is compared with the user IDs 2411 recorded in the inside telephone number file 2410. If a match is present, the user name 2412 corresponding to the matched user ID 2411 is put into the blank 2502 of the template format 2500. If absent, the user ID 1011 itself is set in the same blank. Subsequently, the blank 2503 of the template format 2500 is loaded with the current date/time obtained from the timer device 17a, while filling the blank 2504 with data representative of the type of operation that the user has requested, i.e., "display", "copy", or "print".

On the other hand, in step 513, the blanks 2511–2513 in the template format 2510 are loaded with relevant character data, followed by step 514. Specifically, one of the index records 231 (or 221) is, initially, searched from within the common index file 230 (or separate index file 221) on the basis of the name of a received facsimile file to be accessed. Then, the sending-end facsimile number placed in the thus obtained index record is compared with the facsimile numbers 2401 recorded in the outside telephone number file 2400. If there is a match, the blank 2511 in the template format 2510 is loaded with the user name 2402 corresponding to the matched facsimile number 2401. If there is no match, the sending-end facsimile number 232 (or 222) itself is put into the blank 2511. The user ID 1011 of a user who has accessed a received facsimile file is compared with the user IDs 2411 recorded in the inside telephone number file 2410. If a match is present, the user name 2412 corresponding to the matched user ID 2411 is put into the blank 2512 of the template format 2510. If absent, the user ID 1011 itself is set in the same blank. Subsequently, the blank 2513 of the template format 2510 is loaded with the current date/time obtained from the timer device 17a.

In step 514, the character data set in step 512 in the template format 2500 being a document sheet for notifying a sending-end user of an occurrence of an access to the received facsimile file, or the character data set in step 513 in the template format 2510 being another document sheet for notifying the sending-end user of an occurrence of deletion of the received facsimile file, is converted into corresponding image data suitable for a facsimile transmission. In addition, a part of the facsimile data of the received facsimile file 211 specified by the name of the received facsimile file accessed (e.g., an upper half of the first or front page thereof) is cut out and placed at a position in the image of the template format, corresponding to the position of the blank 2505 or 2504.

In step 515, facsimile sending job 261 (FIGS. 8 and 23) is created in a manner as follows. The sending-end user ID 2301 in the facsimile sending job data 261 is loaded with the user ID 1001 of the user who has requested processing, the receiving-end facsimile number 2302 is loaded with the sending-end facsimile number 232 (or 222) in the index record 231 (or 221) obtained in step 512 or 513, and the type of data 2302 are set so as to indicate that the data is facsimile data. It should be noted that the sending-end and receiving end mentioned in connection with the facsimile sending job data 261 shown in FIG. 23 are opposite to those in the main stream of the above explanation because the facsimile sending job in FIG. 23 is discussed from the point of view of a facsimile transmission from the facsimile server terminal 1 to the facsimile machine 2 or other facsimile server terminal. The body of data 2310 is loaded with the template format 2500 or 2510 which has been completed with a part of the received facsimile data in step 514.

Finally, in step 516, the facsimile sending job data 261 prepared in step 515 is connected to the facsimile sending queue 260, terminating the process of the response data creating program 501.

Figure 27:
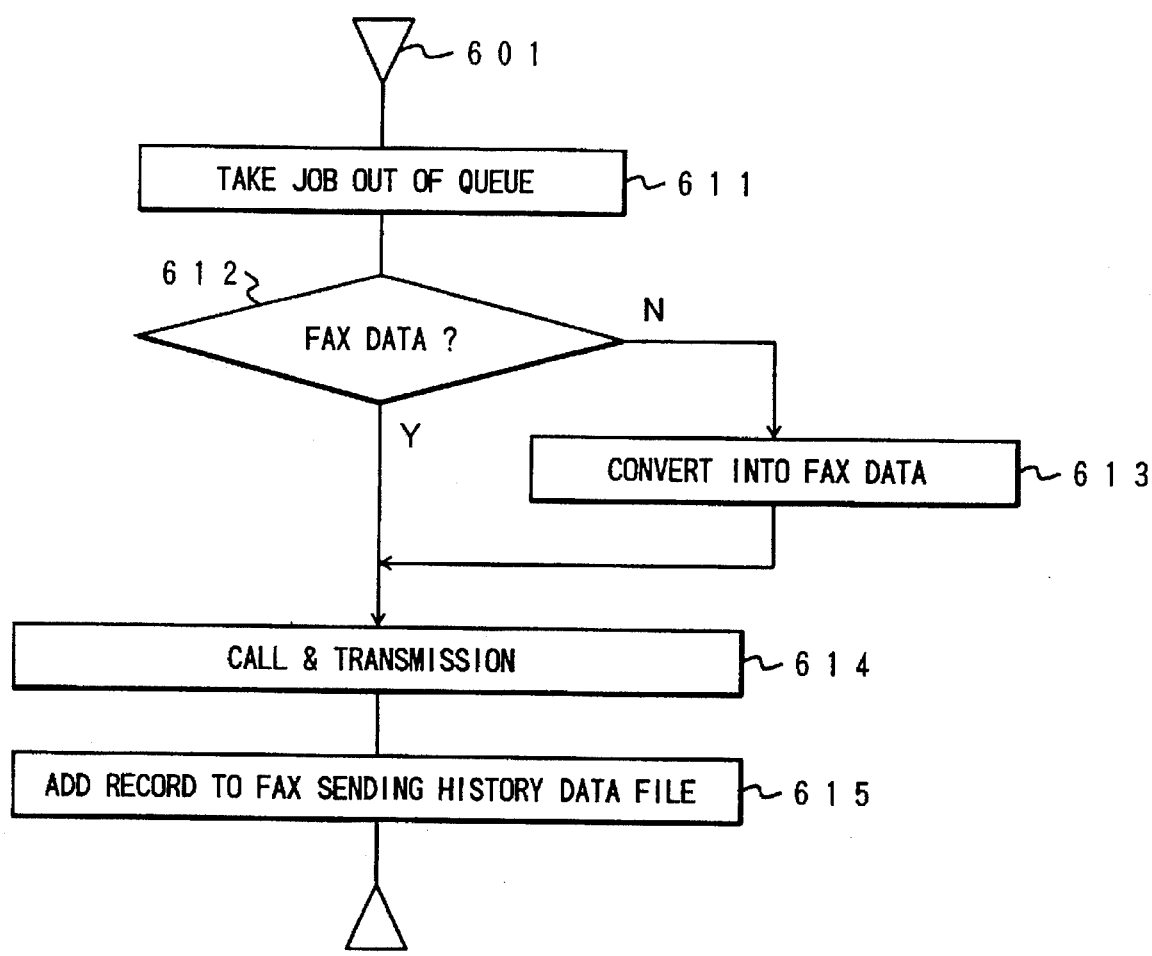
FIG. 27 is a flowchart of a program for sending a facsimile.

Referring now to FIG. 27, there is shown a flowchart of a program for sending a facsimile, which realizes the function of the facsimile transmission processing unit 600.

Upon activation, a facsimile transmission processing program 601, initially, in step 611, takes one of the facsimile sending job data 261 out of the facsimile sending job queue 260.

In step 612, the type of data 2303 in the facsimile sending job data 261 is referenced. If it indicates that the body of data 2310 is "facsimile data" in step 612, control proceeds to step 614 while otherwise control proceeds to step 613.

In step 613, the data positioned in the body of data 2310 is converted into corresponding facsimile data, followed by step 614. In step 614, the facsimile number set in the receiving-end facsimile number 2302 is called by the modem 16 to send the body of data 2310 through the telephone line 5 to the facsimile machine 2. In this event, the sending-end user ID 2301 is sent to the facsimile machine 5 by using the facsimile information field in the facsimile communication procedure. Incidentally, a user name may be sent instead of the sending-end user ID 2301. The user name can be searched by comparing the sending-user ID with the recorded user IDs in the inside telephone number file 2410, such that if there is a match, the user name of the matched user ID 2411 is used in place of the sending-end user ID 2301.

Finally, in step 615, a sending history record 251 corresponding to the sending process in step 614 is added into the facsimile sending history data file 250 (FIG. 7). More specifically, the sending-end user ID 252 in the sending history record 251 is loaded with the sending-end user ID 2301 contained in the facsimile sending job data 261, while the receiving-end facsimile number 253 is loaded with the receiving-end facsimile number 2302 contained in the facsimile sending job data 261. Similarly, the time of transmission 254 is loaded with date/time data obtained from the timer device 17a, while the transmission result 255 is loaded with the result of the sending process conducted in step 614, i.e., data representative of NORMAL, NETWORK ERROR, and the like.

As stated herein before, at the time when a user of the client terminal 3 makes a first access to received facsimile data for either of display, copy, deletion or print, response data is automatically created and sent back to the facsimile machine 2 at the sending end of the received facsimile data, by using the received facsimile managing program 301, the response data creating program 501, the facsimile sending program 601, and the associated data. In particular, the response data, which is sent when the first access is a deletion, is made different from that when the first access is display, copy and print, so as to attract the special attention of the user who receives the response data.

With this arrangement of the invention, it is possible for a sending-end user who sent a facsimile to recognize whether the receiving-end user has actually accessed the facsimile data, thereby enhancing the reliability of facsimile transmission for the sending-end user. In addition, the sending-end user also recognizes what type of access is made to the facsimile data, particularly a deletion of the facsimile data without the content thereof being seen, and hence it is possible for the sending-end user to know whether or not it is necessary to re-send the same facsimile data. Further, the receiving end user need not acknowledge receipt of the facsimile data by any other means, relieving the receiving-end user of the responsibility of doing so.

The embodiment explained above is directed to a facsimile server system in which the facsimile server terminal 1 receives and stores facsimile data, and the client terminal 3 accesses the facsimile data stored in the facsimile server terminal 1, at which time response data is created and sent to the facsimile machine 2 at the sending end. Alternatively, the present invention is applicable to a facsimile machine which has a memory device to temporarily store received facsimile data so as to print or delete the stored data in response to a user's command. That is, in this type of facsimile machine, it is possible to automatically create and send response data back to the facsimile machine 2 at the sending end in accordance with the present invention at the time when the print or deletion is conducted by the user.

What is claimed is:

1. A facsimile server system, comprising:

a facsimile server terminal including a sending/receiving means for sending/receiving facsimile data via a communication line and a storage means for storing facsimile data received by the sending/receiving means;

a client terminal coupled via a network to said facsimile server terminal and including an access means responsive to a user's command for accessing received facsimile data stored in said storage means in said facsimile server terminal;

said facsimile server terminal further including:

a management means for managing a sending-end facsimile number in correspondence with the received facsimile data in a case where the facsimile data is received together with the sending-end facsimile number at a receiving end, and also for managing access information in correspondence with the received facsimile data, said access information indicating whether or not the facsimile data stored in said storage means has already been accessed by said access means in said client terminal; and a response data sending means, activated when the facsimile data stored in said storage means is accessed by said access means in said client terminal and when said access information indicates that the facsimile data has not yet been accessed by said access means, for calling said sending-end facsimile number corresponding to the accessed facsimile data to send back response data which indicates that the facsimile data has been accessed by a user at the receiving end, said response data including a receiving-end user identifier indicative of a user of the client terminal who has accessed the receiver terminal, a type of access made by said access means, and a time when the access was made by said access means by the receiving-end user identifier indicative of a user of the client terminal who has accessed the received facsimile data stored in said storage means in said facsimile;

said storage means comprising a reception history data file for storing reception history data including data specifying received facsimile data, and reception process result data indicating at least whether or not the reception was normal;

wherein said sending/receiving means creates reception history data upon every receipt of facsimile data, and stores the data in said reception history data file.

2. The facsimile server system according to claim 1, wherein said facsimile server terminal includes a timer means for indicating the time of the access made by said access means.

3. A facsimile server system, comprising:

a facsimile server terminal including a sending/receiving means for sending/receiving facsimile data via a communication line and a storage means for storing facsimile data received by the sending/receiving means;

a client terminal coupled via a network to said facsimile server terminal and including an access means responsive to a user's command for accessing received facsimile data stored in said storage means in said facsimile server terminal;

said facsimile server terminal further including:

a management means for managing a sending-end facsimile number in correspondence with the received facsimile data in a case where the facsimile data is received together with the sending-end facsimile number, and also for managing access information in correspondence with the received facsimile data, said access information indicating whether or not the facsimile data stored in said storage means has already been accessed by said access means in said client terminal; and a response data sending means, activated when the facsimile data stored in said storage means is accessed by said access means in said client terminal and when said access information indicates that the facsimile data has not yet been accessed by said access means, for calling said sending-end facsimile number corresponding to the accessed facsimile data for sending back response data indicating that the facsimile data has been accessed by a user at a receiving end;

said storage means comprising a reception history data file for storing reception history data including data specifying received facsimile data, and reception process result data indicating at least whether or not the reception was normal;

wherein said sending/receiving means creates reception history data upon every receipt of facsimile data, and stores the data in said reception history data file, wherein said response data contains a receiving-end user identifier indicative of a user of the client terminal who has accessed the received facsimile data stored in said storage means in said facsimile server terminal, a type of access made by said access means, and a time when the access was made by said access means, and wherein said response data contains a part of received facsimile data accessed by said access means comprising image data.

4. The facsimile server system according to claim 3, wherein said facsimile server terminal includes means for storing, as said response data, facsimile data in a template format having blank areas to be loaded with said receiving-end user identifier, said type of access, said time when the access was made, said sending-end user identifier, and said part of the facsimile data, and wherein said response data sending means completes, in response to an access to said received facsimile data, the facsimile data in the template format with a receiving-end user identifier, a type of the access made by said access means, the time when the access was made, a receiving-end user identifier, and a part of the facsimile data, obtained with respect to the access.

5. A facsimile server system, comprising:

a facsimile server terminal including a sending/receiving means for sending/receiving facsimile data via a communication line and a storage means for storing facsimile data received by the sending/receiving means;

a client terminal coupled via a network to said facsimile server terminal and including an access means responsive to a user's command for accessing received facsimile data stored in said storage means in said facsimile server terminal;

said facsimile server terminal further including:

a management means for managing a sending-end facsimile number in correspondence with the received facsimile data in a case where the facsimile data is received together with the sending-end facsimile number, and also managing access information in correspondence with the received facsimile data, said access information indicating whether or not the facsimile data stored in said storage means has already been accessed by said access means in said client terminal; and a response data sending means, activated when the facsimile data stored in said storage means is accessed by said access means in said client terminal and when said access information indicates that the facsimile data has not yet been accessed by said access means, for calling said sending-end facsimile number corresponding to the accessed facsimile data to send back response data which indicates that the facsimile data has been accessed by a user at a receiving end;

said storage means comprising a reception history data file for storing reception history data including data specifying received facsimile data, and reception process result data indicating at least whether or not the reception was normal;

wherein said sending/receiving means creates reception history data upon every receipt of facsimile data, and stores the data in said reception history data file, wherein said response data contains a receiving-end user identifier indicative of a user of the client terminal who has accessed the received facsimile data stored in said storage means in said facsimile server terminal, a type of access made by said access means, and a time when the access was made by said access means, and wherein said client terminal notifies said facsimile server terminal of a type of access to said facsimile server terminal with respect to a specific received facsimile data which is stored in said storage means when the access is made, said access including a display access for displaying the received facsimile data, a copying access for copying the received facsimile data, a deleting access for deleting the received facsimile data, and a printing access for printing the received facsimile data;

said sending means creating said response data by writing the type of access notified by said client terminal into said response data as the type of access to be included in said response data.

6. A facsimile server system, comprising:

a facsimile server terminal including a sending/receiving means for sending/receiving facsimile data via a communication line and a storage means for storing facsimile data received by the sending/receiving means;

a client terminal coupled via a network to said facsimile server terminal and including an access means responsive to a user's command for accessing received facsimile data stored in said storage means in said facsimile server terminal;

said facsimile server terminal further including:

a management means for managing a sending-end facsimile number in correspondence with the received facsimile data in a case where the facsimile data is received together with the sending-end facsimile number, and also for managing access information in correspondence with the received facsimile data, said access information indicating whether or not the facsimile data stored in said storage means has already been accessed by said access means in said client terminal; and a response data sending means, activated when the facsimile data stored in said storage means is accessed by said access means in said client terminal and when said access information indicates that the facsimile data has not yet been accessed by said access means, for calling said sending-end facsimile number corresponding to the accessed facsimile data to send back response data which indicates that the facsimile data has been accessed by a user at a receiving end;

said storage means comprising a reception history data file for storing reception history data including data specifying received facsimile data, and reception process result data indicating at least whether or not the reception was normal;

wherein said sending/receiving means creates reception history data upon every receipt of facsimile data, and stores the data in said reception history data file, wherein said response data contains a receiving-end user identifier indicative of a user of the client terminal who has accessed the received facsimile data stored in said storage means in said facsimile server terminal, a type of access made by said access means, and the time when the access was made by said access means, and wherein said client terminal notifies said facsimile server terminal of a type of access to said facsimile server terminal with respect to a specific received facsimile data which is stored in said storage means when the access is made, said access including a display access for displaying the received facsimile data, a copying access for copying the received facsimile data, a deleting access for deleting the received facsimile data, and a printing access for printing the received facsimile data;

said response data sending means creating response data by writing the type of access notified by said client terminal into said response data as the type of access to be included in said response data.

7. A facsimile server connected to at least one client terminal, for sending/receiving facsimile data for the connected client terminal, comprising:

a sending/receiving means for sending/receiving facsimile data via a communication line;

a storage means for storing received facsimile data from said sending/receiving means; and a response data sending means for sending a response data to a sending-end of the facsimile data, when an access has been made by a client terminal to any one of the facsimile data stored in said storage means, said response data indicating that the specific facsimile data has been accessed;

said response data further including at least a type of access made by the client terminal, and a part of image data in the received facsimile data accessed, said type of access being any one of a display access for displaying received facsimile data at the client terminal which had made access thereto, a copy access for copying the received facsimile data, a delete access for deleting the received facsimile data, and a print access for printing the received facsimile data.

8. A facsimile server connected to at least one client terminal, and sending/receiving facsimile data for the connected client terminal, comprising:

a sending/receiving means for sending/receiving facsimile data via a communication line;

a storage means for storing received facsimile data from said sending/receiving means; and a response data sending means for sending a response data to a sending-end of the facsimile data, when an access has been made to any one of the facsimile data stored in said storage means by a client terminal which is the sending-end of the facsimile data, said response data indicating that the specific facsimile data has been accessed;

said response data sending means creating response data which includes at least a type of access made by the client terminal, and a part of image data in the received facsimile data accessed, said type of access being any one of a display access for displaying received facsimile data at the client terminal which had made access thereto, a copy access for copying the received facsimile data, a delete access for deleting the received facsimile data, and a print access for printing the received facsimile data wherein said means for storing the facsimile data stores first facsimile data in a first format when the type of access is the deletion, and stores second facsimile data in a second format when the type of access is other than the deletion.

9. A facsimile server system comprising:

a facsimile server terminal including a sending/receiving means for sending/receiving facsimile data via a communication line and a storage means for storing facsimile data received by the sending/receiving means;

a client terminal coupled via a network to said facsimile server terminal and including an access means responsive to a user's command for accessing received facsimile data stored in said storage means in said facsimile server terminal;

said facsimile server terminal further including:

a management means for managing a sending-end facsimile number in correspondence with the received facsimile data in a case where the facsimile data is received together with the sending-end facsimile number, and also managing access information in correspondence with the received facsimile data, said access information indicating whether or not the facsimile data stored in said storage means has already been accessed by said access means in said client terminal; and a response data sending means, activated when the facsimile data stored in said storage means is accessed by said access means in said client terminal and when said access information indicates that the facsimile data has not yet been accessed by said access means, for calling said sending-end facsimile number corresponding to the accessed facsimile data to send back response data which indicates that the facsimile data has been accessed by a user at a receiving end;

said storage means comprising a reception history data file for storing reception history data including data specifying received facsimile data, and reception process result data indicating at least whether or not the reception was normal;

wherein said sending/receiving means creates reception history data upon every receipt of facsimile data, and stores the data in said reception history data file, wherein said response data contains a receiving-end user identifier indicative of, a user of the client terminal who has accessed the received facsimile data stored in said storage means in said facsimile server terminal, a type of access made by said access means, and the time when the access was made by said access means, wherein said response data contains a part of received facsimile data accessed by said access means, and said part of said received facsimile data is image data, wherein said facsimile server terminal includes means for storing, as said response data, facsimile data in a template format having blank areas to be loaded with said receiving-end user identifier, said type of access, said time when the access was made, said sending-end user identifier, and said part of the facsimile data, and wherein said response data sending means completes, in response to an access to said received facsimile data, the facsimile data in the template format with a receiving-end user identifier, a type of the access made by said access means, the time when the access was made, a receiving-end user identifier, and a part of the facsimile data, obtained with respect to the access, and wherein said means for storing the facsimile data stores first facsimile data in a first format when the type of access is a deletion and stores second facsimile data in a second format when the type of access is other than the deletion.

10. A facsimile machine, comprising:

a sending/receiving means for sending/receiving facsimile data via a communication line and a storage means for storing facsimile data received by the sending/receiving means and an access means responsive to a user's command for accessing received facsimile data stored in said storage means;

a management means for managing a sending-end facsimile number in correspondence with the received facsimile data in a case where the facsimile data is received together with the sending-end facsimile number, and also managing access to said access information indicating whether or not the facsimile data stored in said storage means has already been accessed by said access means; and a response data sending means, activated when the facsimile data stored in said storage means is accessed by said access means and when said access information indicates that the facsimile data has not yet been accessed by said access means, for calling said sending-end facsimile number corresponding to the accessed facsimile data to send back response data which indicates that the facsimile data has been accessed by a user at a receiving end;

said storage means comprising a reception history data file for storing reception history data including data specifying received facsimile data, and indicating at least whether or not a reception of the received facsimile data was normal;

wherein said sending/receiving means creates reception history data upon every receipt of facsimile data, and stores the data in said reception history data file.

* * * * *